United States Patent
Yajima et al.

(10) Patent No.: US 12,091,527 B2
(45) Date of Patent: Sep. 17, 2024

(54) SILSESQUIOXANE

(71) Applicants: OCHANOMIZU UNIVERSITY, Tokyo (JP); DAIKIN INDUSTRIES, LTD., Osaka (JP)

(72) Inventors: Tomoko Yajima, Tokyo (JP); Moeka Sano, Tokyo (JP); Tadashi Kanbara, Osaka (JP); Tsuyoshi Noguchi, Osaka (JP)

(73) Assignees: OCHANOMIZU UNIVERSITY, Tokyo (JP); DAIKIN INDUSTRIES, LTD., Osaka (JP)

( * ) Notice: Subject to any disclaimer, the term of this patent is extended or adjusted under 35 U.S.C. 154(b) by 927 days.

(21) Appl. No.: 17/089,837

(22) Filed: Nov. 5, 2020

(65) Prior Publication Data

US 2021/0054174 A1 Feb. 25, 2021

Related U.S. Application Data

(63) Continuation of application No. PCT/JP2019/018117, filed on Apr. 26, 2019.

(30) Foreign Application Priority Data

May 7, 2018 (JP) .................. 2018-089452

(51) Int. Cl.
*C08L 33/10* (2006.01)
*C08K 5/5419* (2006.01)
*C08F 20/24* (2006.01)
*C08F 20/28* (2006.01)

(52) U.S. Cl.
CPC ............ *C08K 5/5419* (2013.01); *C08L 33/10* (2013.01); *C08F 20/24* (2013.01); *C08F 20/28* (2013.01)

(58) Field of Classification Search
CPC .......... C08L 33/10; C08F 20/24; C08F 20/28
See application file for complete search history.

(56) References Cited

U.S. PATENT DOCUMENTS

| | | | |
|---|---|---|---|
| 2012/0157702 A1* | 6/2012 | Marciniec | C08G 77/385 556/446 |
| 2016/0319156 A1 | 11/2016 | Rathore et al. | |
| 2018/0030246 A1 | 2/2018 | Matsumoto et al. | |
| 2019/0023851 A1 | 1/2019 | Yajima et al. | |

FOREIGN PATENT DOCUMENTS

| | | | |
|---|---|---|---|
| JP | 2002-105205 A | | 4/2002 |
| JP | 2016203478 A | * | 12/2016 |
| JP | 2017-508013 A | | 3/2017 |
| WO | 2016/133108 A1 | | 8/2016 |
| WO | 2017/126688 A1 | | 7/2017 |

OTHER PUBLICATIONS

English language abstract JP 2016-203478 Dec. 2016.*
Extended European Search Report issued Jan. 19, 2022 in counterpart European Application No. 19800795.7.
International Preliminary Report on Patentability with a Translation of Written Opinion in International Application No. PCT/JP2019/018117, issued on Nov. 10, 2020.
International Search Report for PCT/JP2019/018117 dated Jul. 23, 2019 [PCT/ISA/210].

* cited by examiner

*Primary Examiner* — Margaret G Moore
(74) *Attorney, Agent, or Firm* — Sughrue Mion, PLLC

(57) ABSTRACT

A silsesquioxane compound represented by the following formula (I): $(R^a SiO_{1.5})_n$, wherein $R^a$ is, each independently at each occurrence, $R^b$ or $R^c$; provided that at least one $R^a$ is $R^b$; $R^b$ is —$R^1$—$CF_2$—$R^2$—$R^3$; $R^1$ is a divalent group; $R^2$ is a divalent polymer chain; $R^3$ is a halogen atom or a hydrogen atom; $R^c$ is a hydrogen atom, an alkyl group, a phenyl group, or —$(OSiR^{15}_2)_j$—$R^{15}$; $R^{15}$ is, each independently at each occurrence, a hydrogen atom or an alkyl group having 1 to 6 carbon atoms; j is, each independently at each occurrence, an integer of 1 to 3; and n is an arbitrary integer.

4 Claims, No Drawings

SILSESQUIOXANE

This is a continuation application under 37 C.F.R. § 1.53(b) of International Application No. PCT/JP2019/018117 filed Apr. 26, 2019, which claims priority from Japanese Patent Application No. 2018-089452 filed May 7, 2018. The above-noted applications are incorporated herein by reference in their respective entireties.

TECHNICAL FIELD

The present disclosure relates to silsesquioxane.

BACKGROUND ART

Demands for silsesquioxane compounds, in particular, compounds in which various groups are introduced into branched chains of the silsesquioxane skeleton have been increased in recent years. For example, Patent Literature discloses, as such a silsesquioxane compound, a cage silsesquioxane skeleton having dendrimeric branched chains extended through amide bonds.

CITATION LIST

Patent Literature

Patent Literature 1: International Patent Publication No. WO2016/133108

SUMMARY OF THE INVENTION

Problem to be Solved by the Invention

While the compound described in Patent Literature 1 has polymer branched chains extended through amide bonds, there is a demand for the silsesquioxane compounds having other structures. Therefore, an object of the present disclosure is to provide a new silsesquioxane compound.

Means to Solve the Problem

The present disclosure includes the following embodiments [1] to [9].

[1] A silsesquioxane compound represented by the following formula (I):

wherein
$R^a$ is, each independently at each occurrence, $R^b$ or $R^c$; provided that at least one $R^a$ is $R^b$;
$R^b$ is —$R^1$—$CF_2$—$R^2$—$R^3$;
$R^2$ is a divalent group;
$R^2$ is a divalent polymer chain;
$R^3$ is a halogen atom or a hydrogen atom;
$R^c$ is a hydrogen atom, an alkyl group, a phenyl group, or —$(OSiR^{15}_2)_j$—$R^{15}$;
$R^{15}$ is, each independently at each occurrence, a hydrogen atom or an alkyl group having 1 to 6 carbon atoms;
j is, each independently at each occurrence, an integer of 1 to 3; and
n is an arbitrary integer.

[2] The silsesquioxane compound according to the above-described [1], wherein
$R^1$ is —$(OSiR^{41}_2)_k$—$R^{42}$—;
$R^{41}$ is, each independently at each occurrence, a hydrogen atom or an alkyl group having 1 to 6 carbon atoms;

k is, each independently at each occurrence, an integer of 0 to 3; and
$R^{42}$ is, each independently at each occurrence, alkylene having 1 to 10 carbon atoms, alkenylene having 2 to 10 carbon atoms, alkynylene having 2 to 10 carbon atoms, arylene having 6 to 22 carbon atoms, heteroarylene having 6 to 22 carbon atoms, an ether having 2 to 10 carbon atoms, or an ester having 1 to 10 carbon atoms, all of which are optionally substituted.

[3] The silsesquioxane compound according to the above-described [1] or [2], wherein $R^1$ is —$(CF_2)_{s1}$— wherein s1 is an integer of 2 to 10, or —$(CF_2)_{t1}O(CF_2)_{t2}$— wherein t1 and t2 are each independently an integer of 2 to 6.

[4] The silsesquioxane compound according to any one of the above-described [1] to [3], wherein $R^3$ is bromine or iodine.

[5] The silsesquioxane compound according to any one of the above-described [1] to [4], wherein the divalent polymer chain is a divalent fluorine-containing polymer chain.

[6] The silsesquioxane compound according to any one of the above-described [1] to [5], wherein the polymer chain is composed of a monomer unit selected from mono fluoroethylene, 1,1-difluoroethylene, 1,3-difluoroethylene, trifluoroethylene, tetrafluoroethylene, 1,1,1,2-tetrafluoro-2-propylene, hexafluoropropylene, perfluoro(alkylvinyl ether), chlorotrifluoroethylene, vinylidene fluoride, (meth)acrylic acid, (meth)acrylic acid ester, styrene, vinyl acetate, vinyl chloride, vinylidene chloride, and 1,3-butadiene.

[7] A silsesquioxane compound represented by the following formula (II):

wherein
$R^d$ is, each independently at each occurrence, $R^e$ or $R^f$; provided that at least one $R^d$ is $R^e$;
$R^e$ is —$R^{11}$—$CF_2$—$R^{13}$;
$R^{11}$ is a divalent group;
$R^{13}$ is a halogen atom;
$R^f$ is a hydrogen atom, an alkyl group, a phenyl group, or —$(OSiR^{15}_2)_j$—$R^{15}$;
$R^{15}$ is, each independently at each occurrence, a hydrogen atom or an alkyl group having 1 to 6 carbon atoms;
j is, each independently at each occurrence, an integer of 1 to 3; and
n is an arbitrary integer.

[8] The silsesquioxane compound according to the above-described [7], wherein $R^{13}$ is iodine.

[9] A rubber composition comprising the silsesquioxane compound according to any one of the above-described [1] to [6] and a rubber material.

Effect of the Invention

The present disclosure can provide a new silsesquioxane compound.

EMBODIMENTS TO CARRY OUT THE INVENTION

The present disclosure provides a silsesquioxane compound represented by the following formula (I):

wherein
$R^a$ is, each independently at each occurrence, $R^b$ or $R^c$; provided that at least one $R^a$ is $R^b$;

$R^b$ is —$R^1$—$CF_2$—$R^2$—$R^3$;

$R^1$ is a divalent group;

$R^2$ is a divalent polymer chain;

$R^3$ is a halogen atom or a hydrogen atom;

$R^c$ is a hydrogen atom, an alkyl group, a phenyl group, or —$(OSiR^{15}_2)_j$—$R^{15}$;

$R^{15}$ is, each independently at each occurrence, a hydrogen atom or an alkyl group having 1 to 6 carbon atoms;

j is, each independently at each occurrence, an integer of 1 to 3; and n is an arbitrary integer.

In the above-described formula, $R^a$ is a so-called branched chain of silsesquioxane and each independently at each occurrence, $R^b$ or $R^c$; provided that at least one $R^a$ is $R^b$.

In the above-described formula, $R^b$ is —$R^1$—$CF_2$—$R^2$—$R^3$;

The above-described $R^1$ is a divalent organic group.

The above-described divalent organic group means a divalent group containing carbon. Representative examples of such a divalent organic group include a divalent hydrocarbon group and a group having one or more of N, O, S, Si, amide, sulfonyl, siloxane, carbonyl, carbonyloxy, and the like at the terminal of the skeleton or in the molecular chain of such a divalent hydrocarbon group. In a preferable embodiment, the divalent organic group is a divalent hydrocarbon group.

When used in the present specification, the "divalent hydrocarbon group" is a divalent group containing carbon and hydrogen. Such a divalent hydrocarbon group is not limited, and examples thereof include a divalent aliphatic hydrocarbon group and an aromatic hydrocarbon group, which are optionally substituted with one or more substituents. The above-described "aliphatic hydrocarbon group" may be any linear, branched, or cyclic group, and may be any saturated or unsaturated group. For example, the hydrocarbon group may contain one or more ring structures. The hydrocarbon group is preferably a hydrocarbon group having 1 to 20 carbon atoms, and more preferably a hydrocarbon group having 2 to 10 carbon atoms.

The substituent of the above-described hydrocarbon group is not limited, and examples thereof include a halogen atom; and one or more groups selected from a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{3-10}$ aryl group, and a 5 to 10-membered heteroaryl group, all of which are optionally substituted with one or more halogen atoms.

In one embodiment, $R^1$ may be —$(OSiR^{41}_2)_k$—$R^{42}$—.

The above-described $R^{41}$ is, each independently at each occurrence, a hydrogen atom or an alkyl group having 1 to 6 carbon atoms, and preferably a hydrogen atom or a methyl group.

The above-described k is, each independently at each occurrence, an integer of 0 to 3.

In one embodiment, k is 0. That is, $R^1$ is $R^{42}$.

In another embodiment, k is an integer of 1 to 3.

The above-described $R^{42}$ may be, each independently at each occurrence, alkylene having 1 to 10 carbon atoms, alkenylene having 2 to 10 carbon atoms, alkynylene having 2 to 10 carbon atoms, arylene having 6 to 22 carbon atoms, heteroarylene having 6 to 22 carbon atoms, an ether having 2 to 10 carbon atoms, or an ester having 1 to 10 carbon atoms, all of which are optionally substituted, or a combination of two to five groups selected from these groups.

In a preferable embodiment, $R^{42}$ may be, each independently at each occurrence, alkylene having 1 to 10 carbon atoms, arylene having 6 to 22 carbon atoms, or an ether having 2 to 10 carbon atoms, all of which are optionally substituted, in particular, all of which are optionally substituted with a fluorine atom.

In another preferable embodiment, $R^{42}$ may be, each independently at each occurrence, alkylene having 1 to 10 carbon atoms optionally substituted, in particular, optionally substituted with a fluorine atom.

The substituent of the above-described $R^{42}$ is not limited and preferable examples thereof include a halogen atom; and one or more groups selected from an alkyl group having 1 to 6 carbon atoms, an aryl group having 6 to 10 carbon atoms, and a 5 to 10-membered heteroaryl group, all of which are optionally substituted with one or more halogen atoms. The substituent of above-described $R^{42}$ preferably may contain a halogen atom, more preferably an iodine atom or a bromine atom, and further preferably an iodine atom.

In a preferable embodiment, $R^{42}$ is, each independently at each occurrence, —$R^{43}$—$CR^{44}R^{45}$—$CHR^{46}$—$(CR^{48}_2)_I$—.

The above-described $R^{43}$ may be alkylene having 1 to 7 carbon atoms, alkenylene having 2 to 7 carbon atoms, alkynylene having 2 to 7 carbon atoms, arylene having 6 to 22 carbon atoms, heteroarylene having 6 to 22 carbon atoms, an ether having 2 to 7 carbon atoms, or an ester having 1 to 7 carbon atoms, all of which are optionally single bonded, substituted, or a combination of two to five groups selected from these groups.

The above-described $R^{43}$ is preferably —$R^{49}$—$R^{50}$—$R^{51}$—.

The above-described $R^{49}$ may be a single bond or alkylene having 1 to 7 carbon atoms.

The above-described $R^{50}$ is a single bond, arylene having 6 to 22 carbon atoms, or heteroarylene having 6 to 22 carbon atoms, and preferably a single bond or arylene having 6 to 22 carbon atoms. Such arylene having 6 to 22 carbon atoms is preferably phenylene or naphthylene.

The above-described $R^{51}$ may be a single bond or alkylene having 1 to 7 carbon atoms.

The above-described $R^{43}$ may be preferably a single bond or alkylene having 1 to 7 carbon atoms.

The above-described $R^{44}$ is a hydrogen atom, a bromine atom, or an iodine atom, preferably a bromine atom or an iodine atom, and more preferably an iodine atom.

The above-described $R^{45}$ and $R^{46}$ are, each independently, a hydrogen atom or an alkyl group having 1 to 3 carbon atoms, and preferably a hydrogen atom.

The above-described $R^{48}$ is, each independently at each occurrence, a hydrogen atom or a fluorine atom, and preferably a fluorine atom.

The above-described I is an integer of 1 to 8, and preferably an integer of 1 to 5.

In one embodiment, $R^1$ is —$(CF_2)_{s1}$, wherein s1 is an integer of 2 to 10 or —$(CF_2)_{t1}O(CF_2)_{t2}$, wherein t1 and t2 are each independently an integer of 2 to 6.

In the above-described formula, $R^2$ is a divalent polymer chain.

The above-described divalent polymer chain means a chain in which at least 2, preferably 5 or more, and preferably 20 or more units derived from one or more monomers are bonded together.

In one embodiment, the above-described monomer is a monomer having at least one fluorine atom (hereinafter also referred to as a "fluorine-containing monomer").

In one embodiment, the above-described fluorine-containing monomer may be a compound having a perfluoropolyether group or a perfluoroalkyl group, and a polymerizable group A described below.

The above-described fluorine-containing monomer may have two or more perfluoropolyether groups or perfluoroalkyl groups, and polymerizable groups A.

The above-described perfluoroalkyl group is a group represented by $C_jF_{2j+1}$, wherein j is an integer of 1 to 30, preferably an integer of 3 to 20 such as an integer of 5 to 10. The perfluoroalkyl group may be linear or branched, but it is preferably linear.

In one embodiment, the above-described perfluoroalkyl group is a linear perfluoroalkyl group having 1 to 10 carbon atoms. In particular, the above-described perfluoroalkyl group is represented by $F$—$(CF_2)_n$—, wherein n is an integer of 1 to 10, and more preferably, n is an integer of 4 to 8 such as 6.

The above-described perfluoropolyether group (hereinafter also referred to as "PFPE") is a group represented by the following formula:

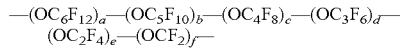

—$(OC_6F_{12})_a$—$(OC_5F_{10})_b$—$(OC_4F_8)_c$—$(OC_3F_6)_d$—$(OC_2F_4)_e$—$(OCF_2)_f$— wherein a, b, c, d, e, and f are each independently an integer of 0 or more and 200 or less, and the sum of a, b, c, d, e, and f is at least 1. Preferably, a, b, c, d, e, and f are each independently an integer of 0 or more and 100 or less. The sum of a, b, c, d, e, and f is preferably 5 or more and more preferably 10 or more. The sum of a, b, c, d, e, and f is preferably 200 or less and more preferably 100 or less. For example, it is 10 or more and 200 or less, and more specifically 10 or more and 100 or less. In addition, the occurrence order of respective repeating unit, which is shown in parenthesis subscripted with a, b, c, d, e, or f, is not limited in the formula.

These repeating units may be linear or branched, but they are preferably linear. For example, —$(OC_6F_{12})$— may be —$(OCF_2CF_2CF_2CF_2CF_2CF_2)$—, —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$— or the like, but it is preferably —$(OCF_2CF_2CF_2CF_2CF_2CF_2)$—. —$(OC_5F_{10})$— may be —$(OCF_2CF_2CF_2CF_2CF_2)$—, —$(OCF(CF_3)CF_2CF_2CF_2)$—, —$(OCF_2CF(CF_3) CF_2CF_2)$—, —$(OCF_2CF_2CF(CF_3) CF_2)$—, —$(OCF_2CF_2CF_2CF(CF_3))$— or the like, but it is preferably —$(OCF_2CF_2CF_2CF_2CF_2)$—. —$(OC_4F_8)$— may be any of —$(OCF_2CF_2CF_2CF_2)$—, —$(OCF(CF_3) CF_2CF_2)$—, —$(OCF_2CF(CF_3) CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5) CF_2)$— and —$(OCF_2CF(C_2F_5))$—, but it is preferably —$(OCF_2CF_2CF_2CF_2)$—. —$(OC_3F_3)$— may be any of —$(OCF_2CF_2CF_2)$—, —$(OCF(CF_3)CF_2)$— and —$(OCF_2CF(CF_3))$—, but it is preferably —$(OCF_2CF_2CF_2)$—. In addition, —$(OC_2F_4)$— may be any of —$(OCF_2CF_2)$— and —$(OCF(CF_3))$—, but it is preferably —$(OCF_2CF_2)$—.

In one embodiment, the above-described PFPE is $(OC_3F_6)_d$—, wherein d is an integer of 1 or more and 200 or less, preferably 5 or more and 200 or less, and more preferably 10 or more and 200 or less. Preferably, PFPE is —$(OCF_2CF_2CF_2)_d$, wherein d is an integer of 1 or more and 200 or less, preferably 5 or more and 200 or less, and more preferably 10 or more and 200 or less, or —$(OCF(CF_3)CF_2)_d$, wherein d is an integer of 1 or more and 200 or less, preferably 5 or more and 200 or less, and more preferably 10 or more and 200 or less. More preferably, PFPE is —$(OCF_2CF_2CF_2)_d$, wherein d is an integer of 1 or more and 200 or less, preferably 5 or more and 200 or less, and more preferably 10 or more and 200 or less.

In another embodiment, PFPE is —$(OC_4F_8)_c$—$(OC_3F_6)_d$—$(OC_2F_4)_e$—$(OCF_2)_f$—, wherein c and d are each independently an integer of 0 or more and 30 or less; e and f are each independently an integer of 1 or more and 200 or less, preferably 5 or more and 200 or less, and more preferably 10 or more and 200 or less; the sum of c, d, e, and f is preferably an integer of 10 or more and 200 or less; and the occurrence order of each repeating unit, which is shown in parenthesis subscripted with c, d, e, or f, is not limited in the formula. Preferably, PFPE is $(OCF_2CF_2CF_2CF_2)_c$—$(OCF_2CF_2CF_2)_d$—$(OCF_2CF_2)_e$—$(OCF_2)_f$—. In one embodiment, PFPE may be —$(OC_2F_4)_e$—$(OCF_2)_f$—, wherein e and f are each independently an integer of 1 or more and 200 or less, preferably 5 or more and 200 or less, and more preferably 10 or more and 200 or less, and the occurrence order of respective repeating unit, which is shown in parenthesis subscripted with e or f, is not limited in the formula.

In still another embodiment, PFPE is a group represented by —$(R^{61}$—$R^{62})_k$—, wherein $R^{61}$ is $OCF_2$ or $OC_2F_4$, and preferably $OC_2F_4$; and $R^{62}$ is a group selected from $OC_2F_4$, $OC_3F_6$, $OC_4F_8$, $OC_5F_{10}$, and $OC_6F_{12}$, or alternatively a combination of two or three groups independently selected from these groups. Preferably, $R^{62}$ is a group selected from $OC_2F_4$, $OC_3F_6$, and $OC_4F_8$, or alternatively a combination of two or three groups independently selected from these groups. Examples of the combination of two or three groups independently selected from $OC_2F_4$, $OC_3F_6$, and $OC_4F_8$ are not limited, but include —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, $OC_4F_8OC_2F_4$—, —$OC_2F_4OC_2F_4OC_3F_6$—, —$OC_2F_4OC_2F_4OC_4F_8$—, $OC_2F_4OC_3F_6OC_2F_4$—, —$OC_2F_4OC_3F_6OC_3F_6$—, —$OC_2F_4OC_4F_8OC_2F_4$—, $OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. The above-described k is an integer of 2 to 100, and preferably an integer of 2 to 50. In the above-described formula, $OC_2F_4$, $OC_3F_6$, $OC_4F_8$, $OC_5F_{10}$, and $OC_6F_{12}$ may be either linear or branched, and they are preferably linear. In this embodiment, PFPE is preferably —$(OC_2F_4$—$OC_3F_6)_k$— or —$(OC_2F_4$—$OC_4F_8)_k$—.

In one embodiment, PFPE may be a group having a $((\alpha\beta)_i)$ chain composed of two or more linking $(\alpha\beta)$ units, wherein the $(\alpha\beta)$ unit has one to three $(\alpha)$ groups composed of at least one of oxyperfluoroalkylene groups having 1 to 2 carbon atoms and one to three $(\beta)$ groups composed of at least one of oxyperfluoroalkylene groups having 3 to 6 carbon atoms.

The above-described compound may have another oxyperfluoroalkylene group not belonging to the $((\alpha\beta)_i)$ chain.

The order of $(\alpha)$ groups and $(\beta)$ groups in the $(\alpha\beta)$ unit is not limited. For example, when two $(\alpha)$ groups are present, these two $(\alpha)$ groups may be linked or may be bonded via at least one $(\beta)$ group.

The above-described PFPE may have a $((\alpha\beta)_i)$ chain composed of two or more linking $(\alpha\beta)$ units. When one end of the $(\alpha\beta)$ unit is the $(\alpha)$ group and the other end is the $(\beta)$ group, in the $((\alpha\beta)_i)$ chain, it is preferable that two or more $(\alpha\beta)$ units be linked in a way such that the $(\alpha)$ group and the $(\beta)$ group are arranged alternately between units. That is, it is preferable that adjoining $(\alpha\beta)$ units be bonded to form a head-to-tail structure. In the $(\alpha\beta)$ unit, the bonding order of $(\alpha)$ groups and $(\beta)$ groups is not limited. That is, $(\alpha)$ groups and $(\beta)$ groups may be arranged randomly, $(\alpha)$ groups and (β) groups may be arranged alternately, or two or more blocks composed of a plurality of groups may be linked.

Examples of the (αβ) unit include the following:
($CF_2CF_2O$—$CF_2CF_2CF_2O$),
($CF_2CF_2O$—$CF_2CF_2CF_2CF_2O$),
($CF_2CF_2O$—$CF_2CF_2CF_2OCF_2CF_2CF_2O$),
($CF_2CF_2O$—$CF_2CF(CF_3)$ $OCF_2CF_2CF_2O$),
($CF_2CF_2O$—$CF_2CF_2CF_2CF_2OCF(CF_3)$ $CF_2O$).

In particular, a preferable embodiment of the above-described PFPE is represented by formula (1) below:

$$-O-[(Rf^1O)_{x1}(Rf^2O)_{x2}(Rf^3O)_{x3}(Rf^4O)_{x4}(Rf^5O)_{x5}(Rf^6O)_{x6}]_i-$$

wherein the symbols in formula (1) are as follows:

i is an integer of 1 or more, and preferably an integer of 2 or more. The upper limit of i is preferably 45. i is preferably 4 to 40 and particularly preferably 5 to 35;

x1 to x2 are each independently an integer of 0 to 3, and x1+x2 is an integer of 1 to 3;

x3 to x6 are each independently an integer of 0 to 3, and x3+x4+x5+x6 is an integer of 1 to 3;

$Rf^1$ is a perfluoroalkylene group having 1 carbon atom;
$Rf^2$ is a perfluoroalkylene group having 2 carbon atoms;
$Rf^3$ is a perfluoroalkylene group having 3 carbon atoms;
$Rf^4$ is a perfluoroalkylene group having 4 carbon atoms;
$Rf^5$ is a perfluoroalkylene group having 5 carbon atoms; and
$Rf^6$ is a perfluoroalkylene group having 6 carbon atoms.

The above-described polymerizable group A is not limited, but examples thereof include a group having an ethylenic double bond and derivatives thereof.

The polymerizable group A is preferably a group represented by the following formula:

$$-R^{163}-CR^{164}=CR^{165}_2$$

wherein $R^{163}$ is a single bond, —O—, —CO—, or —OC(O)—;

$R^{164}$ represents a hydrogen atom, a fluorine atom, or an alkyl group having 1 to 10 carbon atoms (preferably an alkyl group having 1 to 3 carbon atoms, and more preferably a methyl group), a lactam group (preferably a β-lactam, γ-lactam, or δ-lactam group, and more preferably a γ-lactam group) or a phenyl group, wherein the alkyl group, the lactam group, and the phenyl group are optionally substituted with a fluorine atom, and is preferably a methyl group or a hydrogen atom; and $R^{165}$ each independently represents a hydrogen atom or a fluorine atom, and is preferably a hydrogen atom.

In the present embodiment, a preferable polymerizable group A is a group represented by the following formula:

$$-R^{163}-CR^{164}=CR^{165}_2$$

wherein $R^{163}$ is a single bond or —OC(O)—;

$R^{164}$ represents a hydrogen atom, a fluorine atom, or an alkyl group having 1 to 10 carbon atoms (preferably an alkyl group having 1 to 3 carbon atoms, and more preferably a methyl group), a lactam group (preferably a β-lactam, γ-lactam, or δ-lactam group, and more preferably a γ-lactam group) or a phenyl group wherein the alkyl group, the lactam group, and the phenyl group are optionally substituted with a fluorine atom, and is preferably a methyl group or a hydrogen atom, and it preferably represents a hydrogen atom, a fluorine atom, or an alkyl group having 1 to 10 carbon atoms (preferably an alkyl group having 1 to 3 carbon atoms, and more preferably a methyl group) or a phenyl group where the alkyl group and the phenyl group are optionally substituted with a fluorine atom, and is more preferably a methyl group or a hydrogen atom; and $R^{165}$ is as defined above.

A more preferable polymerizable group A is a group represented by the following formula:

$$-OC(O)-CR^{164}=CR^{165}_2$$

wherein $R^{164}$ and $R^{165}$ are as defined above.

A further preferable polymerizable group A is an acryloyl group or a methacryloyl group.

Examples of the fluorine-containing monomer are not limited, but include, for example, at least one compound represented by any of the following formulae (A1), (A2), (B1), and (B2):

$$Rf^{\alpha}-PFPE-X-R^{71} \qquad (A1)$$

$$R^{71}-X-PFPE-X-R^{71} \qquad (A2)$$

$$Rf^{\alpha}-PFPE-R^{72}-R^{73}-(R^{74})_{n10}-R^{75}-R^{76} \qquad (B1)$$

$$R^{76}-R^{75}-(R^{74})_{n10}-R^{73}-R^{72}-PFPE-R^{72}-R^{73}-(R^{74})_{n10}-R^{75}-R^{76} \qquad (B2)$$

wherein $Rf^{\alpha}$ each independently represents an alkyl group having 1 to 16 carbon atoms optionally substituted with one or more fluorine atoms;

PFPE is as defined above;

$R^{71}$ each independently represents a polymerizable group A;

X represents a divalent organic group;

$R^{72}$ is a group represented by the following formula:

$$-(Q)_{e1}-(CFZ)_{f1}-(CH_2)_{g1}-$$

wherein Q, each independently at each occurrence, represents an oxygen atom, phenylene, carbazolylene, —NR— (wherein R represents a hydrogen atom or an organic group), or a divalent polar group; Z, each independently at each occurrence, represents a hydrogen atom, a fluorine atom, or a lower fluoroalkyl group; e1, f1, and g1 are each independently an integer of 0 or more and 50 or less; the sum of e1, f1, and g1 is at least 1; and the occurrence order of each repeating unit, which is shown in parenthesis, is not limited in the formula;

$R^{73}$ each independently represents a divalent organic group;

$R^{74}$, each independently at each occurrence, represents $R^{74a}$ or $R^{74b}$, provided that at least one $R^{74}$ is $R^{74a}$;

$R^{74a}$, each independently at each occurrence, represents a divalent organic group having a polymerizable group;

$R^{74b}$, each independently at each occurrence, represents a divalent organic group not having a polymerizable group;

n10 is each independently an integer of 1 or more and 50 or less;

$R^{75}$ each independently represents —O—, —S—, —NH— or a single bond; and $R^{76}$ each independently represents a monovalent organic group or a hydrogen atom.

When used in the present specification, the "monovalent organic group" and the "divalent organic group" mean monovalent and divalent groups containing carbon, respectively.

In the above-described formulae (A1) and (A2), $R^{71}$ each independently represents a polymerizable group A.

$R^{71}$ is preferably a group represented by the following formula:

$$-R^{63}-CR^{64}=CH_2$$

wherein R$^{63}$ is a single bond, —O—, —CO—, or —OC(O)—; and

R$^{64}$ represents a hydrogen atom, a fluorine atom, or an alkyl group having 1 to 10 carbon atoms (preferably an alkyl group having 1 to 3 carbon atoms, and more preferably a methyl group), a lactam group (preferably a β-lactam, γ-lactam, or δ-lactam group, and more preferably a γ-lactam group) or a phenyl group, where the alkyl group, the lactam group, and the phenyl group are optionally substituted with a fluorine atom, and is preferably a methyl group or a hydrogen atom.

A more preferable polymerizable group is a group represented by the following formula:

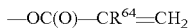
—OC(O)—CR$^{64}$=CH$_2$ wherein R$^{64}$ is as defined above.

Further preferably, R$^{71}$ is an acryloyl group or a methacryloyl group.

In the above-described formulae (A1) and (B1), Rf$^a$ represents an alkyl group having 1 to 16 carbon atoms optionally substituted with one or more fluorine atoms.

In the above-described alkyl group having 1 to 16 carbon atoms optionally substituted with one or more fluorine atoms, the "alkyl group having 1 to 16 carbon atoms" may be linear or branched, and it is preferably a linear or branched alkyl group having 1 to 6 carbon atoms, particularly 1 to 3 carbon atoms, and more preferably a linear alkyl group having 1 to 3 carbon atoms.

In addition, Rf$^a$ is preferably an alkyl group having 1 to 16 carbon atoms substituted with one or more fluorine atoms, more preferably a CF$_2$H—C$_{1-15}$ fluoroalkylene group or a perfluoroalkylene group, further preferably a perfluoroalkyl group having 1 to 16 carbon atoms, and further more preferably a perfluoroalkyl group having 1 to 6 carbon atoms, particularly 1 to 3 carbon atoms.

In the above-described formulae (A1) and (A2), X each independently represents a divalent organic group. The X group is understood as a linker linking PFPE and R$^{71}$. Accordingly, the X group may be any divalent organic group as long as a compound represented by the above-described formulae (A1) and (A2) can be stably exist.

Examples of the above-described X are not limited, but it is preferably, for example, a group represented by the following formula:

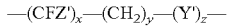
—(CFZ')$_x$—(CH$_2$)$_y$—(Y')$_z$— wherein Z' represents a fluorine atom or a perfluoroalkyl group having 1 to 3 carbon atoms or a derivative group thereof;

Y' represents —OCO—, —OCONH—, or —CONH—, or an organic group containing one of them;

x, y, and z are each independently an integer of 0 to 3; and the occurrence order of each repeating unit, which is shown in parenthesis subscripted with x, y, or z, is not limited in the formula.

Specific examples of the above-described X include, for example:
—CF$_2$CF$_2$CH$_2$—
—CF$_2$CF$_2$CH$_2$—OCO—
—CF$_2$CF$_2$CH$_2$—CONH—
—CF$_2$CF$_2$CH$_2$—OCONH—
or the like.

In the above-described formulae (B1) and (B2), R$^{72}$ is a group represented by the formula: -(Q)$_{e1}$-(CFZ)$_{f1}$—(CH$_2$)$_{g1}$—, wherein e1, f1, and g1 are each independently an integer of 0 or more and 50 or less; the sum of e1, f1, and g1 is at least 1; and the occurrence order of each repeating unit, which is shown in parenthesis, is not limited in the formula.

In the above-described formula, Q represents an oxygen atom, phenylene, carbazolylene, —NR— (wherein R represents a hydrogen atom or an organic group), or a divalent polar group, and it is preferably an oxygen atom or a divalent polar group, and more preferably an oxygen atom.

Examples of the "divalent polar group" in the above-described Q are not limited, but include —C(O)—, —C(=NR$^h$)— and —C(O)NR$^h$—, wherein R$^h$ represents a hydrogen atom or a lower alkyl group. The "lower alkyl group" is, for example, an alkyl group having 1 to 6 carbon atoms, such as methyl, ethyl, or n-propyl, and these may be substituted with one or more fluorine atoms.

In the above-described formula, Z represents a hydrogen atom, a fluorine atom, or a lower fluoroalkyl group, and is preferably a fluorine atom.

The above-described "lower fluoroalkyl group" is, for example, a fluoroalkyl group having 1 to 6 carbon atoms, preferably 1 to 3 carbon atoms, preferably a perfluoroalkyl group having 1 to 3 carbon atoms, more preferably a trifluoromethyl group or a pentafluoroethyl group, and further preferably a trifluoromethyl group.

R$^{72}$ is preferably a group represented by the formula: —(O)$_{e1}$—(CF$_2$)$_{f1}$—(CH$_2$)$_{g1}$—, wherein e1, f1, and g1 are as defined above, and the occurrence order of each repeating unit, which is shown in parenthesis, is not limited in the formula.

Examples of the group represented by the above-described formula: —(O)$_e$—(CF$_2$)$_f$—(CH$_2$)$_g$— include, for example, a group represented by —(O)$_{e'}$—(CF$_2$)$_{f'}$—(CH$_2$)$_{g'}$—O—[(CH$_2$)$_{g''}$—O-]$_{g'''}$, wherein e' is 0 or 1, f', g', and g'' are each independently an integer of 1 to 10, and g is 0 or 1.

In the above-described formulae (B1) and (B2), R$^{73}$ represents a divalent organic group.

The R$^{73}$ group is preferably —C(R$^{73a}$)(R$^{73b}$)—, wherein R$^{73a}$ and R$^{73b}$ each independently represent a hydrogen atom or an alkyl group, and either R$^{73a}$ or R$^{73b}$ is preferably an alkyl group.

In the above-described formulae (B1) and (B2), R$^{74}$, each independently at each occurrence, represents R$^{74a}$ or R$^{74b}$, provided that at least one R$^{74}$ is R$^{74a}$.

The above-described R$^{74a}$, each independently at each occurrence, represents a divalent organic group having a polymerizable group.

R$^{74a}$ is preferably a group represented by the following formula:

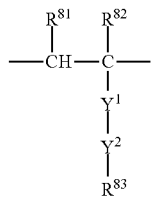

In the above-described formula, R$^{81}$, each independently at each occurrence, represents a hydrogen atom or an alkyl group. Such R$^{81}$ is preferably a hydrogen atom.

In the above-described formula, R$^{82}$, each independently at each occurrence, represents a hydrogen atom or an alkyl group. Such R$^{82}$ is preferably a methyl group or a hydrogen atom, and is more preferably a hydrogen atom.

In the above-described formula, $R^{83}$, each independently at each occurrence, represents an organic group having a polymerizable group.

Examples of such a polymerizable group include those equivalent to the above-described ones, but it is preferably $CH_2=CX^1—C(O)—$, wherein $X^1$ represents a hydrogen atom, a halogen atom such as a chlorine atom, a fluorine atom, or an alkyl group having 1 to 10 carbon atoms optionally substituted with fluorine, and specific examples thereof include $CH_2=C(CH_3)—C(O)—$ or $CH_2=CH—C(O)—$.

In the above-described formula, $Y^1$ represents —O—, $N(R^f)$—, phenylene, or carbazolylene, wherein $R^f$ represents an organic group, and is preferably an alkyl group.

$Y^1$ is preferably —O—, phenylene, or carbazolylene, more preferably —O— or phenylene, and further preferably —O—.

In the above-described formula, $Y^2$ represents a linker whose backbone has 1 to 16 (more preferably 2 to 12, and further preferably 2 to 10) carbon atoms. Examples of the $Y^2$ are not limited, but include, for example, $—(CH_2—CH_2—O)_{p10}—$, wherein p10 represents an integer of 1 to 10, for example, an integer of 2 to 10, $—(CHR^g)_{p20}—O—$, wherein p20 is an integer of 1 to 40 and $R^g$ represents hydrogen or a methyl group, $—(CH_2—CH_2—O)_{p30}—CO—NH—CH_2—CH_2—O—$, wherein p30 represents an integer of 1 to 10, for example, an integer of 2 to 10, $—CH_2—CH_2—O—CH_2—CH_2—$, $—(CH_2)_{p40}—$, wherein p40 represents an integer of 1 to 6, $—(CH_2)_{p}50-O—CONH—(CH_2)_{p60}—$, wherein p50 represents an integer of 1 to 8, preferably 2 or 4 and p60 represents an integer of 1 to 6, preferably 3, or —O—, provided that $Y^1$ is not —O—. Preferable examples of $Y^2$ include $—(CH_2—CH_2—O)_{p10}—$, wherein p10 represents an integer of 1 to 10, for example, an integer of 2 to 10, or $—(CHR^d)_{p20}—O—$, wherein p20 is an integer of 1 to 40 and $R^d$ represents hydrogen or a methyl group, and specific examples thereof include $—(CH_2—CH_2—O)_2—$ or $—CH_2—CH_2—O—$. Note that, in these groups, the left end is bonded to the side of the molecular backbone (the side of $Y^1$) and the right end is bonded to the side of the polymerizable group (the side of $R^{83}$).

$R^{74a}$ is further preferably a group represented by the following formula:

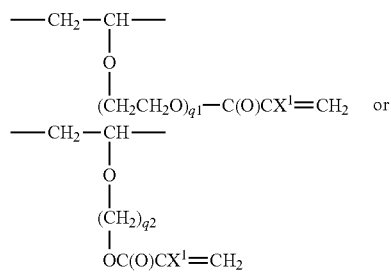

In the above-described formula, $X^1$ represents a hydrogen atom, a halogen atom such as a chlorine atom or a fluorine atom, or an alkyl group having 1 to 10 carbon atoms optionally substituted with fluorine, and is preferably a hydrogen atom or an alkyl group having 1 to 10 carbon atoms such as a methyl group. In the above-described formula, q1 is an integer of 1 to 10, and preferably an integer of 1 to 5 such as 1 or 2. q2 is an integer of 1 to 10, and preferably an integer of 1 to 5 such as 2.

The above-described $R^{74b}$, each independently at each occurrence, represents a divalent organic group not having a polymerizable group.

$R^{74b}$ is preferably $—(CHR^{74c}—CR^{74d}R^{74e})_s—$, wherein $R^{74c}$ and $R^{74d}$ each independently represent a hydrogen atom or an alkyl group; s is an integer of 0 to 50; and the $R^{74e}$ group is $-Q'—R^{74f}$, wherein Q' is as definede for the above-described Q, $R^{74f}$ is an organic group not having a polymerizable group, and is a group that a $R^{74g}$ group described later is bonded via a linker or directly to Q'.

The linker is preferably as follows:

(a) $—(CH_2—CH_2—O)_{s1}—$, wherein s1 represents an integer of 1 to 10, for example, an integer of 2 to 10;

(b) $—(CHR^{74h})_{s2}—O—$, wherein s2 represents the number of repetitions, which is an integer of 1 to 40, and $R^{74h}$ represents hydrogen or a methyl group;

(c) $—(CH_2—CH_2—O)_{s1}—CO—NH—CH_2—CH_2—O—$, wherein s1 is as defined above;

(d) $—CH_2—CH_2—O—CH_2—CH_2—$;

(e) $—(CH_2)_{s3}—$, wherein s3 represents an integer of 1 to 6; or (f) $—(CH_2)_{s4}—O—CONH—(CH_2)_{s5}$, wherein s4 represents an integer of 1 to 8, preferably 2 or 4, and s5 represents an integer of 1 to 6, preferably 3; or (g) —O—, provided that Q' is not —O—.

$R^{74g}$ is preferably the following group:

(i) an alkyl group

Examples: methyl and ethyl;

(ii) a chain group containing an alkyl group substituted with fluorine

Examples

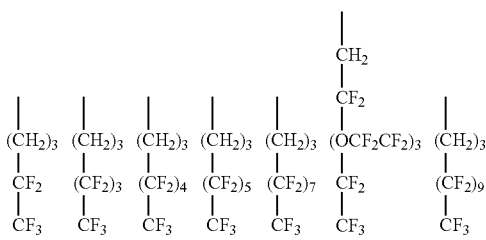

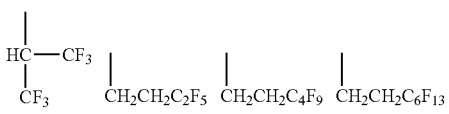

(iii) a group containing one or more cyclic moieties selected from the group consisting of a monocyclic carbocycle, a bicyclic carbocycle, a tricyclic carbocycle and a tetracyclic carbocycle Examples

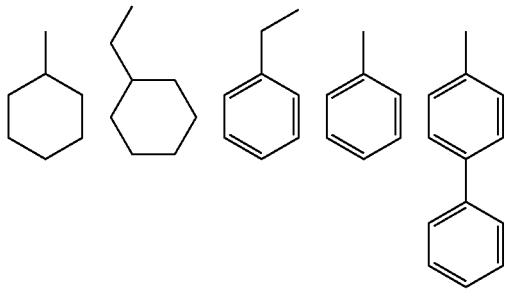

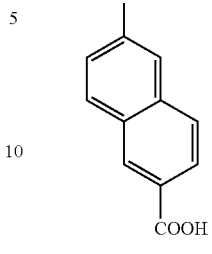

(iv) a group containing a hydrocarbon group substituted with one or more (preferably one or two) carboxy groups Examples

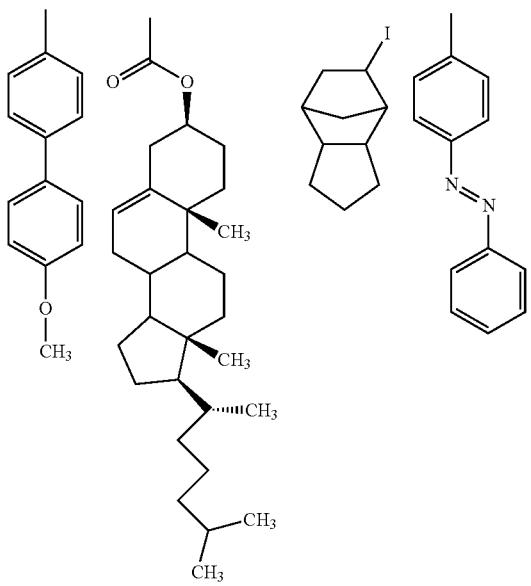

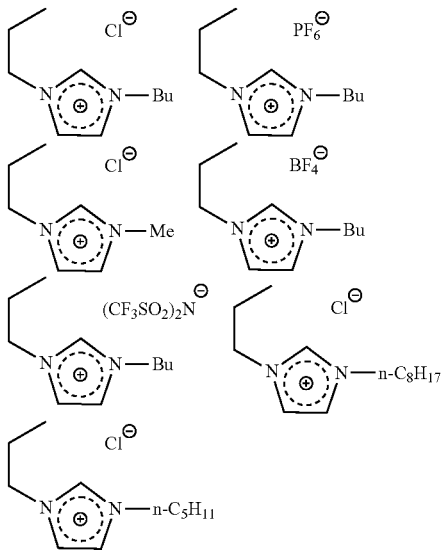

(v) a group containing one or more (preferably one) amino groups;
(vi) a hydrogen atom; or
(vii) a group containing an imidazolium salt Examples

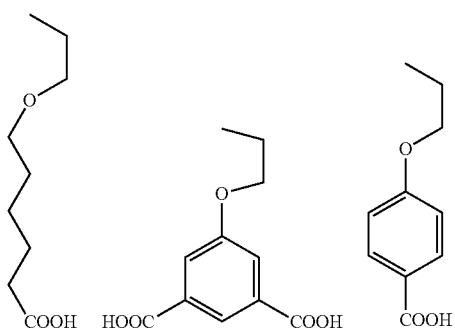

$R^{74g}$ is more preferably a hydrogen atom or an alkyl group that may be fluorinated and bonded via an ethylene chain; more preferably a hydrogen atom, a methoxyethyl group, an isobutyl group, or $R^{31}$—$CF_2$—$(CF_2)_{s6}$—$(CF_2)_{s7}$—O—$(CH_2)_2$—, wherein $R^{31}$ is a fluorine atom or a hydrogen atom, s6 is an integer of 0 to 6, and s7 is an integer of 1 to 6; and further preferably a 3-(perfluoroethyl) propoxyethyl group [rational formula: $CF_3$—$(CF_2)$—$(CH_2)_3$—O—$(CH_2)_2$—].

In the above-described $R^{74}$, the constituent unit $R^{74a}$ and the constituent unit $R^{74b}$ may each form a block or may be bonded randomly.

In the above-described formulae (B1) and (B2), n10 is an integer of 1 or more and 100 or less, preferably an integer of 1 or more and 50 or less, and further preferably an integer of 2 or more and 30 or less.

In the above-described formulae (B1) and (B2), $R^{75}$ represents —O—, —S—, —NH— or a single bond, and is preferably —O—.

In the above-described formulae (B1) and (B2), $R^{76}$ represents a monovalent organic group or a hydrogen atom.

$R^{76}$ is preferably $Rf^\alpha$—PFPE-$R^{72}$, wherein $Rf^\alpha$, PFPE, and $R^{72}$ are as defined above, or an alkyl group having 1 to 10 carbon atoms optionally substituted with fluorine, more preferably an alkyl group having 1 to 6 carbon atoms, and further preferably methyl.

In one embodiment, compounds represented by the above-described formulae (B1) and (B2) may be at least one compound represented by the following general formulae (B1a) and (B2a), respectively:

[Formula 8]

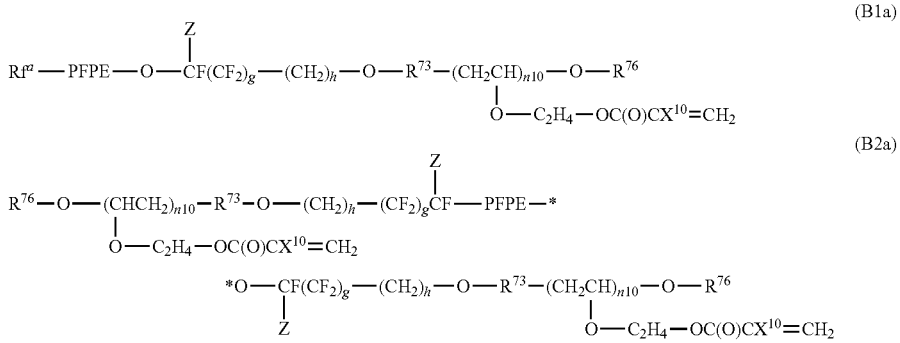

wherein $Rf^\alpha$, PFPE, $R^{73}$, $R^{76}$, $X^1$, Z, and n10 are as defined above;

g is 0 or 1; and h is 1 or 2.

Another example of the fluorine-containing monomer is a compound represented by:

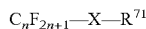

wherein $R^{71}$ and X are as defined above; and n is an integer of 1 to 30, and preferably an integer of 3 to 20 such as an integer of 4 to 10.

Still another example of the fluorine-containing monomer is a fluorine-containing acrylate ester indicated by the formula:

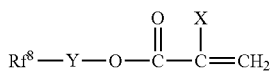

wherein X is a hydrogen atom, a methyl group, a fluorine atom, a chlorine atom, a bromine atom, an iodine atom, a $CFX^1X^2$ group (provided that $X^1$ and $X^2$ are, independently of each other, a hydrogen atom, a fluorine atom, a chlorine atom, a bromine atom, or an iodine atom), a cyano group, a linear or branched fluoroalkyl group having 1 to 21 carbon atoms, a substituted or unsubstituted benzyl group, or a substituted or unsubstituted phenyl group; Y is an aliphatic group having 1 to 10 carbon atoms, an aromatic group or cycloaliphatic group having 6 to 10 carbon atoms, a —$CH_2CH_2N(R)SO_2$— group (provided that R is an alkyl group having 1 to 4 carbon atoms), or a —$CH_2CH(OY^1)$ $CH_2$— group (provided that $Y^1$ is a hydrogen atom or an acetyl group); and $Rf^8$ is a linear or branched fluoroalkyl group or fluoroalkenyl group having 1 to 6 carbon atoms.

In the fluorine-containing acrylate ester, X is preferably a hydrogen atom or a methyl group.

In the above-described formula, the $Rf^8$ group is preferably a perfluoroalkyl group or a perfluoroalkenyl group. The number of carbons in the fluoroalkyl group or the fluoroalkenyl group is 1 to 6 such as 1 to 4.

Examples of the fluoroalkyl group include: —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, $CF(CF_3)CF_2CF_2CF_3$, —$(CF_2)_5CF_3$, and —$(CF_2)_3CF(CF_3)_2$.

Examples of the fluoroalkenyl group include: —CF=$CF_2$, —$CF_2$CF=$CF_2$, —$(CF_2)_2$CF=$CF_2$, —$CF_2$C($CF_3$)=$CF_2$, —CF($CF_3$) CF=$CF_2$, —$(CF_2)_3$CF=$CF_2$, —C($CF_3$)$_2$CF=$CF_2$, —$(CF_2)_2$C($CF_3$)=$CF_2$, —$(CF_2)_4$CF=$CF_2$, —$(CF_2)_4$CF=$CF_2$, and —$(CF_2)_3$C ($CF_3$)=$CF_2$.

Y is an aliphatic group having 1 to 10 carbon atoms, an aromatic group or cycloaliphatic group having 6 to 10 carbon atoms, a —$CH_2CH_2N(R)SO_2$— group (provided that R is an alkyl group having 1 to 4 carbon atoms), or a —$CH_2CH(OY^1)CH_2$— group (provided that $Y^1$ is a hydrogen atom or an acetyl group). The aliphatic group is preferably an alkylene group (in particular, that having 1 to 4 such as 1 or 2 carbon atoms). The aromatic group and the cycloaliphatic group may be either substituted or not substituted.

Examples of the fluorine-containing monomer include a fluorine-containing acrylate ester indicated by the formula:

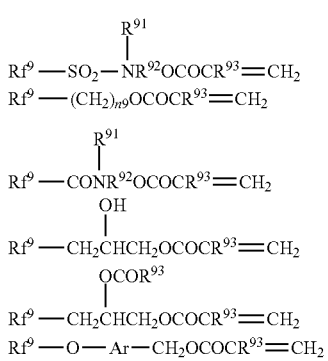

wherein $Rf^9$ represents a perfluoroalkyl group having 1 to 6 carbon atoms;

$R^{91}$ represents a hydrogen atom or an alkyl group having 1 to 10 carbon atoms;

$R^{92}$ represents an alkylene group having 1 to 10 carbon atoms;

$R^{93}$ represents a hydrogen atom or a methyl group;

Ar represents an aryl group optionally having a substituent; and n9 represents an integer of 1 to 10.

In one embodiment, in the above-described formula, $Rf^9$ is preferably a perfluoroalkyl group having 1 to 10 carbon atoms;

$R^{91}$ is preferably a hydrogen atom or an alkyl group having 1 to 10 carbon atoms;

$R^{92}$ is preferably an alkylene group having 1 to 10 carbon atoms;

$R^{93}$ is preferably a hydrogen atom or a methyl group;

Ar is preferably an aryl group optionally having a substituent; and n9 is preferably an integer of 1 to 10.

Specific examples of the fluorine-containing monomer may include:

$CF_3(CF_2)_5(CH_2)OCOCH=CH_2$,
$CF_3(CF_2)_5(CH_2)OCOC(CH_3)=CH_2$,
$CF_3(CF_2)_7(CH_2)OCOCH=CH_2$,
$CF_3(CF_2)_7(CH_2)OCOC(CH_3)=CH_2$,
$(CF_3)_2CF(CF_2)_3(CH_2)_2OCOCH=CH_2$,
$CF_3(CF_2)_3(CH_2)_2OCOC(CH_3)=CH_2$,
$CF_3(CF_2)_3(CH_2)_2OCOCH=CH_2$,
$CF_3(CF_2)_5(CH_2)_2OCOC(CH_3)=CH_2$,
$CF_3(CF_2)_5(CH_2)_2OCOCH=CH_2$,
$CF_3CF_2(CH_2)_2OCOCH=CH_2$,
$CF_3(CFZ)_3SO_2N(CH_3)(CH_2)_2OCOCH=CH_2$,
$CF_3(CF_2)_3SO_2N(C_2H_5)(CH_2)_2OCOC(CH_3)=CH_2$,
$(CF_3)_2CF(CF_2)_3CH_2CH(OCOCH_3)CH_2OCOC(CH_3)=CH_2$,
$(CF_3)_2CF(CF_2)_3CH_2CH(OH)CH_2OCOCH=CH_2$.

In one embodiment, the fluorine-containing monomer has a perfluoroalkyl group and a polymerizable group A.

In the present embodiment, the above-described fluorine-containing monomer is preferably at least one selected from the group consisting of a compound represented by $Rf'CH=CH_2$, a perfluoroolefin, a dimer of a perfluoroolefin, and an oligomer of a perfluoroolefin.

The above-described Rf' is a perfluoroalkyl group, and preferably a linear perfluoroalkyl group having 1 to 10 carbon atoms. In particular, Rf' is represented by $F-(CF_2)_n$-, wherein n is an integer of 1 to 10, and more preferably, n is an integer of 4 to 8 such as 6.

Specific examples of the structure of the above-described compound represented by $Rf'CH=CH_2$ may include, for example, perfluorohexylethylene $(F(CF_2)_6CH=CH_2)$.

Examples of a method for synthesizing the above-described compound represented by $Rf'CH=CH_2$ are not limited, but may include, for example, a method in which a halide represented by $Rf'CH_2CH_2Y^3$, wherein Rf' is as defined above and $Y^3$ is Br or I, and an alkaline metal salt of a carboxylic acid are heated in an alcohol solvent (for example, Japanese Patent Publication No. S39-18112). In the above-described method, the alcohol and the fluorine-containing monomer according to the present embodiment can be separated through a so-called crystallization operation, focusing on the difference between the melting points of the alcohol and the fluorine-containing monomer (for example, a method for separating an olefin-alcohol azeotrope described in Japanese Patent Laid-Open No. 2009-173588).

Examples of the above-described perfluoroolefin may include, for example, tetrafluoroethylene and hexafluoropropene.

Examples of the dimer of a perfluoroolefin or the oligomer of a perfluoroolefin may include, for example, an oligomer of tetrafluoroethylene and an oligomer of hexafluoropropylene. The above-described oligomer of tetrafluoroethylene preferably has a degree of polymerization of 2 to 7, and the above-described oligomer of hexafluoropropylene preferably has a degree of polymerization of 2 to 4. These oligomers are advantageous from the viewpoint that they can be applied to a variety of processing treatments. The oligomer of tetrafluoroethylene or the oligomer of hexafluoropropylene can be obtained by oligomerizing tetrafluoroethylene or hexafluoropropylene with a method described in, for example, U.S. Pat. No. 3,403,191 or U.S. Pat. No. 2,918,501.

The above-described oligomer may be a compound having highly branched molecular chains, composed of many isomers. The above-described oligomer may have, for example, a structure as described below:

Dimer of hexafluoropropene:

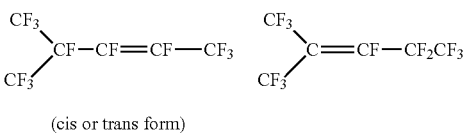

(cis or trans form)

Trimer of hexafluoropropene:

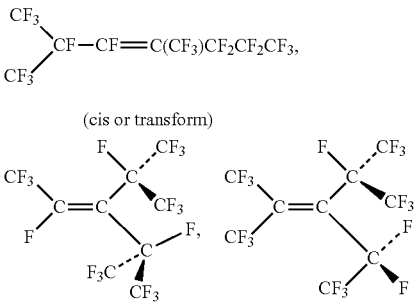

(cis or transform)

Tetramer of hexafluoropropene:

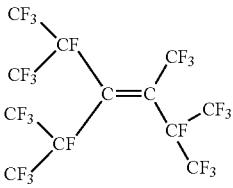

Dimer of tetrafluoroethylene:

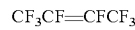

Trimer of tetrafluoroethylene:

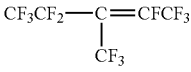

Tetramer of tetrafluoroethylene:

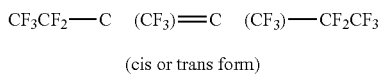

(cis or trans form)

Pentamer of tetrafluoroethylene:

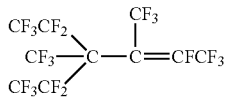

Hexamer of tetrafluoroethylene:

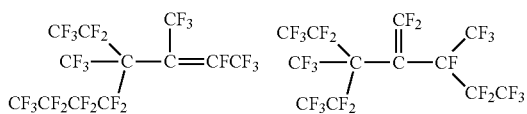

In one embodiment, the above-described fluorine-containing monomer is a compound represented by $Rf^fCH=CH_2$.

In one embodiment, the above-described fluorine-containing monomer is at least one selected from the group consisting of a perfluoroolefin, a dimer of a perfluoroolefin, and an oligomer of a perfluoroolefin.

In another embodiment, the fluorine-containing monomer can be a compound having an ethylenic double bond wherein a part of or all hydrogen atoms of a hydrocarbon are substituted with fluorine atoms.

Examples of the above-described compound having an ethylenic double bond wherein a part of or all hydrogen atoms of a hydrocarbon are substituted with fluorine atoms may include, for example, a reactive olefinic monomer, which is fluorinated, has a alkyl group having 1 to 6 carbon atoms, has no ester group and has an ethylenic double bond, specifically ethylene, propylene, butylene and the like, or a dimer thereof. The above-described compound is preferably a reactive olefinic monomer which has a perfluoroalkyl group having 1 to 6 carbon atoms, has no ester group, and has an ethylenic double bond, specifically perfluoro-substituted ethylene, propylene, butylene, and the like, or a dimer thereof. In a preferable embodiment, a hydrocarbon having an ethylenic double bond wherein a part of or all hydrogen atoms of the hydrocarbon are substituted with fluorine atoms may be tetrafluoroethylene, hexafluoropropylene, a dimer of hexafluoropropylene, or a reactive olefinic monomer having an ethylenic double bond which has a perfluoroalkyl group having 1 to 6 carbon atoms and has no ester group.

In a preferable embodiment, the fluorine-containing monomer comprises at least one selected from the group consisting of a fluorine-containing acrylate ester represented by the formula:

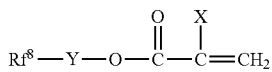

(I)

wherein X, Y, and $Rf^8$ are as defined above, a compound represented by $Rf^fCH=CH_2$ (wherein $Rf^f$ is a perfluoroalkyl group), and a perfluoroolefin. Preferably, X is a hydrogen atom or a methyl group; Y is an aliphatic group having 1 to 10 carbon atoms, an aromatic group or cycloaliphatic group having 6 to 10 carbon atoms, a —$CH_2CH_2N(R)SO_2$— group (provided that R is an alkyl group having 1 to 4 carbon atoms), or a —$CH_2CH(OY^1)CH_2$— group (provided that $Y^1$ is a hydrogen atom or an acetyl group); and the $Rf^8$ group is a perfluoroalkyl group or perfluoroalkenyl group having 1 to 6 carbon atoms, and more preferably 1 to 4 carbon atoms.

In one embodiment, the above-described monomer is a monomer not having a fluorine atom (hereinafter also referred to as a "fluorine-free monomer").

In one embodiment, the above-described fluorine-free monomer may be a compound having a polymerizable group B and not having a fluorine atom.

The polymerizable group B is preferably a group represented by the following formula:

wherein $R^{63'}$ is a single bond or —OC(O)—; and $R^{64'}$ represents a hydrogen atom, or an alkyl group having 1 to 10 carbon atoms (preferably, an alkyl group having 1 to 3 carbon atoms, and more preferably a methyl group), or a phenyl group, and is preferably a methyl group or a hydrogen atom.

A more preferable polymerizable group B is a group represented by the following formula:

wherein $R^{64'}$ is as defined above.

A further preferable polymerizable group B is an acryloyl group or a methacryloyl group.

Examples of a compound having the polymerizable group B may include, for example, (meth)acrylic monomers in which an alkyl group having 1 to 20 carbon atoms is bonded to the ester terminal; and vinyl monomers such as vinylnorbornene, styrene, and vinyl chloride.

Examples of the compound having the polymerizable group B may include, for example, (meth)acrylic monomers in which an alkyl group having 1 to 15 carbon atoms is bonded to the ester terminal, specifically, stearyl (meth)acrylate, isobornyl (meth)acrylate, cyclohexyl (meth)acrylate, (meth)acrylic acid, vinyl acetate, hydroxyethyl (meth)acrylate, hydroxypropyl (meth)acrylate, methyl (meth)acrylate, ethyl (meth)acrylate, butyl (meth)acrylate, ethylene glycol dimethacrylate, N,N-dimethylaminoethyl acrylate, decyl (meth)acrylate, dodecyl (meth)acrylate, dodecenyl (meth)acrylate, tetradecyl (meth)acrylate, and tetradecenyl (meth)acrylate; acrylamide, N,N-dimethyl acrylamide, and N,N-dimethylaminopropyl acrylamide; vinyl monomers such as vinyl propionate, (meth)acrylonitrile, vinylnorbornene, styrene, and vinyl chloride.

In another embodiment, from the viewpoint of increasing the grafting amount, a polyfunctional (meth)acrylate may be used as the above-described compound having the polymerizable group B. The polyfunctional (meth)acrylate is as defined above.

In one embodiment, the polymerizable group B is a group represented by:

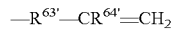

wherein $R^{63'}$ is a single bond; and $R^{64'}$ represents a hydrogen atom, or an alkyl group having 1 to 10 carbon atoms (preferably, an alkyl group having 1 to 5 carbon atoms, and more preferably a methyl group), or a phenyl group, and is preferably a methyl group or a hydrogen atom.

In the present embodiment, examples of the above-described compound having the polymerizable group B may include a compound in which, for example, an alkyl group having 1 to 12 carbon atoms, specifically an alkyl group having 1 to 10 carbon atoms, and more specifically an alkyl group having 3 to 10 carbon atoms is bonded to the above-described polymerizable group B.

In the present embodiment, examples of the above-described compound having the polymerizable group B may include, for example, 1-hexene, 1-octene, 1-decene, 1-dodecene, isobutene, pentene, heptene, and nonene.

The above-described monomer preferably has an ethylenic double bond.

In one embodiment, the above-described divalent polymer chain has at least one unit derived from a fluorine-containing monomer. That is, the above-described divalent polymer chain may be a divalent fluorine-containing polymer chain.

The above-described monomer having at least one fluorine atom may be preferably a so-called perfluoromonomer in which hydrogen atoms are fully substituted with fluorine atoms.

In these fluorine-containing monomers, one or more fluorine atoms may be optionally substituted with other substituents.

In a preferable embodiment, the above-described fluorine-containing monomer is a compound represented by the following formula:

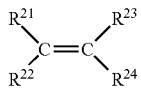

wherein
$R^{21}$ is a hydrogen atom, a halogen atom, or an alkyl group optionally substituted with a halogen atom;
$R^{22}$ is a hydrogen atom, a halogen atom, or an alkyl group optionally substituted with a halogen atom;
$R^{23}$ is a hydrogen atom, a halogen atom, or an alkyl group optionally substituted with a halogen atom;
$R^{24}$ is a hydrogen atom, a halogen atom, $-R^{25}$, $-R^{26}-O-R^{25}$, $-R^{26}-COOR^{25}$, or $-R^{26}-OCOR^{25}$;
$R^{25}$ is a hydrogen atom, a halogen atom, an alkyl group optionally substituted with a halogen atom, or an aryl group optionally substituted with a halogen atom; and
$R^{26}$ is a single bond or an alkylene group optionally substituted with a halogen atom;
provided that, at least one fluorine atom is contained in the formula.

In the above-described formula, the alkyl group is preferably an alkyl group having 1 to 6 carbon atoms, more preferably an alkyl group having 1 to 3 carbon atoms, and further preferably a methyl group.

In the above-described formula, the alkylene group is preferably an alkylene group having 1 to 6 carbon atoms, and more preferably an alkylene group having 1 to 3 carbon atoms.

In the above-described formula, the aryl group is preferably an aryl group having 6 to 22 carbon atoms, and more preferably a phenyl group.

In the above-described formula, the halogen atom is preferably a fluorine atom, a chlorine atom, a bromine atom, or an iodine atom, and more preferably a fluorine atom or a chlorine atom, and further preferably a fluorine atom.

In a preferable embodiment, $R^{24}$ is a fluorine atom, an alkyl group having 1 to 3 carbon atoms optionally substituted with a fluorine atom, an alkoxy group having 1 to 3 carbon atoms optionally substituted with a fluorine atom, an aryl group having 6 to 22 carbon atoms optionally substituted with a fluorine atom, or $-COOR^{25}$ optionally substituted with a fluorine atom, and preferably a fluorine atom, an alkyl group having 1 to 3 carbon atoms optionally substituted with a fluorine atom, or an alkoxy group having 1 to 3 carbon atoms optionally substituted with a fluorine atom.

Examples of the above-described preferable fluorine-containing monomer include, for example, monofluoroethylene, 1,1-difluoroethylene, 1,3-difluoroethylene, trifluoroethylene, tetrafluoroethylene (TFE), 1,1,1,2-tetrafluoro-2-propylene, hexafluoropropylene (HEP), perfluoro(alkylvinyl ether) (PAVE), chlorotrifluoroethylene (CTFE), and vinylidene fluoride (VDF).

In another preferable embodiment, the above-described divalent polymer chain has at least one unit derived from a fluorine-free monomer.

In one embodiment, the above-described fluorine-free monomer is a compound represented by the following formula:

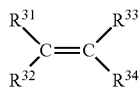

wherein
$R^{31}$ is a hydrogen atom, a chlorine atom, or an alkyl group optionally substituted with a chlorine atom;
$R^{32}$ is a hydrogen atom, a chlorine atom, or an alkyl group optionally substituted with a chlorine atom;
$R^{33}$ is a hydrogen atom, a chlorine atom, or an alkyl group optionally substituted with a chlorine atom;
$R^{34}$ is a hydrogen atom, a chlorine atom, $-R^{35}$, $-R^{36}-O-R^{35}$, $-R^{36}-COOR^{35}$, $-R^{36}-OCOR^{35}$, or $-CHCH_2$;
$R^{35}$ is a hydrogen atom, a chlorine atom, an alkyl group optionally substituted with a chlorine atom, or an aryl group optionally substituted with a chlorine atom; and
$R^{36}$ is a single bond or an alkylene group optionally substituted with a chlorine atom.

In a preferable embodiment, $R^{34}$ is a hydrogen atom, an alkyl group having 1 to 3 carbon atoms optionally substituted with a chlorine atom, an alkoxy group having 1 to 3 carbon atoms optionally substituted with a chlorine atom, an aryl group having 6 to 22 carbon atoms optionally substituted with a chlorine atom, $-COOR^{35}$ optionally substituted with a chlorine atom, or $-CHCH_2$.

Examples of the above-described fluorine-free monomer include, for example, (meth)acrylic acid, (meth)acrylic acid ester, styrene, vinyl acetate, vinyl chloride, vinylidene chloride, and 1,3-butadiene.

When a conjugated diene monomer such as the above-described 1,3-butadiene is used, the obtained polymer chain may have a double bond in the backbone of the polymer chain or may have a double bond in the side chain. For example, when 1,3-butadiene is used as a monomer, the polymer chain may have either one or both units of $-(CH_2CH=CHCH_2)-$ and $-(CH_2CH(CH=CH_2))-$.

The double bond present in the above-described polymer chain can be utilized as a reactive site. For example, by reacting the double bond with $Rf^\alpha$-Hal ($Rf^\alpha$ is fluoroalkyl and Hal is a halogen such as bromine or iodine), —(CH$_2$—CHHal-CHRf$^\alpha$—CH$_2$)— or —(CH$_2$CH(CHHal-CH$_2$Rf$^\alpha$))— can be obtained.

In the above-described formula, R$^3$ is a halogen atom or a hydrogen atom.

The above-described halogen atom is a fluorine atom, a chlorine atom, a bromine atom, or an iodine atom. The halogen atom is preferably an iodine atom.

In one embodiment, R$^3$ is a halogen atom.

In a preferable embodiment, R$^3$ is an iodine atom or a hydrogen atom.

In a preferable embodiment, R$^3$ is an iodine atom.

In the above-described formula, R$^c$ is a hydrogen atom, an alkyl group, a phenyl group, or —(OSiR$^{15}_2$)$_j$—R$^{15}$.

R$^{15}$ is, each independently at each occurrence, a hydrogen atom or an alkyl group having 1 to 6 carbon atoms.

The above-described lower alkyl may be preferably a linear or branched alkyl group having 1 to 10 carbon atoms, and preferably an alkyl group having 1 to 6 carbon atoms.

In the above-described formula, n is an arbitrary integer.

The above-described n may be preferably 4 or more and 200 or less, more preferably 6 or more and 100 or less, and further preferably 6 or more and 20 or less.

The silsesquioxane compound represented by the above-described formula (I) is not limited, but may be any one of a random type, a cage type, or a ladder type, preferably a cage type or a ladder type, and more preferably a cage type.

In a preferable embodiment, the silsesquioxane compound represented by the above-described formula (I) is a cage silsesquioxane compound in which n is 6 to 16, preferably 6 to 14, and particularly preferably 8.

In addition, the present disclosure provides a mixture of the silsesquioxane compounds in which n is any one of 6 to 16. The above-described mixture contains the silsesquioxane compound wherein n is 8 as the main component. For example, the above-described mixture may contain 80 mol % or more, 90 mol % or more, 95 mol % or more, or 98 mol % or more of the silsesquioxane compound wherein n is 8 and the balance may be a silsesquioxane compound wherein n is other than 8.

The number-average molecular weight of the silsesquioxane compound represented by the above-described formula (I) is not limited and can be appropriately set depending on the purpose such as applications. For example, in one embodiment, the number-average molecular weight of the silsesquioxane compound represented by the formula (I) of the present invention is 3.0×10$^3$ to 5.0×10$^5$, preferably 5.0×10$^3$ to 2.5×10$^5$, and particularly preferably 8.0×10$^3$ to 1.0×10$^5$.

The silsesquioxane compound represented by the above-described formula (I) can be obtained by polymerizing a monomer and a halogenated silsesquioxane compound represented by the following formula (II):

(R$^d$SiO$_{1.5}$)n wherein
R$^d$ is, each independently at each occurrence, R$^e$ or R$^f$; provided that at least one R$^d$ is R$^e$;
R$^e$ is —R$^{11}$—CF$_2$—R$^{13}$;
R$^{11}$ is a divalent organic group;
R$^{13}$ is a halogen atom;
R$^f$ is a hydrogen atom or a lower alkyl group; and
n is an arbitrary integer.

By the above-described reaction, R$^e$ in the silsesquioxane compound represented by the formula (II) (that is, —R$^{11}$—CF$_2$—R$^{13}$) and the monomer are reacted to obtain —R$^1$—CF$_2$—R$^2$—R$^3$.

In the above-described formula, R$^d$ is, each independently at each occurrence, R$^e$ or R$^f$; provided that at least one R$^d$ is R$^e$.

In the above-described formula, R$^e$ is —R$^{11}$—CF$_2$—R$^{13}$.

The above-described R$^{13}$ is a divalent organic group.

The above-described divalent organic group is as defined above for the organic group relating to R$^1$ in the above-described formula (I).

In the above-described formula, R$^{13}$ is a halogen atom, —ONR$^x_2$, —TeR$^y$, or —SC(=S)R$^z$, and preferably a halogen atom.

The above-described halogen atom is a chlorine atom, a bromine atom, or an iodine atom. The halogen atom is preferably a bromine atom or an iodine atom, and particularly preferably an iodine atom.

The above-described —ONR$^x_2$ is the initiating terminal of a so-called NMP (Nitroxide mediated polymerization) radical polymerization.

R$^x$ is a hydrocarbon group optionally having a substituent, for example, an alkyl group, or two R$^x$ may be form a ring together with an N atom.

Examples of the above-described —ONR$^x_2$ include, for example, the following groups:

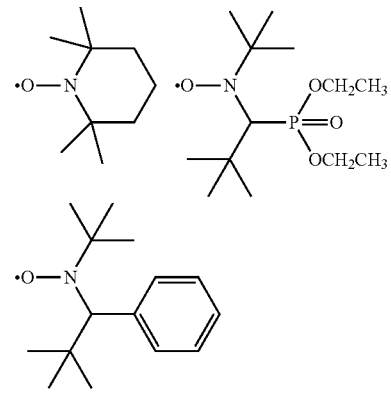

The above-described —TeR$^y$ is the radical polymerization initiating terminal of a so-called TERP (Organo-tellurium-mediated living radical polymerization).

Ry is an alkyl group or an aryl groups, and may be preferably an alkyl group having 1 to 4 carbon atoms or a phenyl group, particularly preferably a methyl group, a n-butyl group, or a phenyl group.

The above-described —SC(=S)R$^z$ is the initiating terminal of a so-called RAFT (Reversible addition-fragmentation chain transfer) radical polymerization. Examples of R$^z$ include the following groups:
phenyl, SR, OR, and NR$_2$
wherein R is an alkyl group.

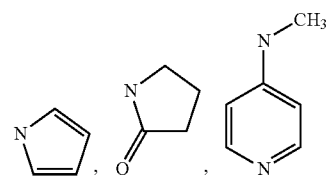

The above-described polymerization method is carried out by various controlled radical polymerization methods exemplified by the so-called iodine transfer polymerization method, ATRP (Atom Transfer Radical Polymerization), RAFT, NMP, the reversible coordination mediated polymerization, TERP, and the like, or the free radical polymerization. The above-described polymerization method is preferably the iodine transfer polymerization method, ATRP, and the reversible coordination mediated polymerization method, and particularly preferably the iodine transfer polymerization method, ATRP, and the reversible coordination mediated polymerization method.

In addition, in the above-described polymerization method, the application of ultraviolet light or visible light, a photoredox catalyst, a one-electron reducing agent, or a radical generating agent may be added, if necessary. These may be used alone or as a mixture of two or more thereof. The reaction conditions thereof are not limited and can be appropriately selected by a person skilled in the art depending on the raw material to be used and the desired product.

Examples of the light source of the above-described ultraviolet ray are not limited as long as it emit ultraviolet rays, and include, for example, a mercury lamp, a xenon lamp, a UV lamp, a halogen lamp, and an LED, and a high-pressure mercury lamp is preferably used.

Examples of the above-described photoredox catalyst include, for example, Rhodamine B, eosin Y, [Ru(bpy)$_3$]$^+$ analog, and [Ir(bpy)$_3$]$^+$ analog.

Examples of the above-described one-electron reducing agent include, for example, lithium dithionite, sodium dithionite, potassium dithionite, cesium dithionite, copper (I) iodide, copper (I) bromide, copper (I) chloride, triethylamine, tributylamine, ascorbic acid, and ascorbate, and it is preferably sodium dithionite, copper (I) iodide, or copper (I) bromide, and particularly preferably sodium dithionite.

Examples of the above-described radical generating agent include, for example, an organic peroxide, an inorganic peroxide, and an organic azo compound, and an organic peroxide is preferably used. Although not limited to the following, for example, examples of the organic peroxide include benzoyl peroxide, examples of the inorganic peroxide include potassium persulfite, and examples of the organic azo compound include AIBN.

The above-described polymerization catalyst may be, for example, phenol such as BHT, vitamin E and vitamin C (ascorbic acid and salt thereof); cyclohexadiene, diethoxyhydrophosphonium oxide, tetraalkyl phosphonium iodide, tetraalkylammonium iodide, N-iodosuccinimide, sodium iodide, copper with a ligand, ruthenium, iron, or cobalt complex.

The above-described ligand may be, for example, N,N'-dimethylethylenediamine, N,N,N',N'-tetramethylethylenediamine, N,N,N',N'-tetraethylethylenediamine, N,N'-ditertiarybutylethylenediamine, tetramethyl 1,3-diaminopropane, N,N,N',N'-pentamethyidlethylenetriamine, N,N,N',N'-tetramethylhexamethylenediamine, N,N,N',N'',N''-pentamethyldiethylenetriamine, 1,1,4,7,10,10-hexamethyltriethylenetetraamine, tris[2-(dimethylamino)ethyl]amine, pyridine, 2,2'-bipyridine, or 4,4'-dicarboxy-2,2'-bipyridine.

In the above-described formula, R$^f$ is a hydrogen atom or lower alkyl.

The above-described lower alkyl may be preferably a linear or branched alkyl group having 1 to 10 carbon atoms, and preferably an alkyl group having 1 to 6 carbon atoms.

The above-described n is as defined for n in the above-described (I).

The monomer to be reacted with the above-described halogenated silsesquioxane compound may be the above-described monomer.

The above-described polymerization conditions are not limited and can be appropriately selected by a person skilled in the art depending on the raw material to be used and the desired product.

The above-described polymerization reaction is preferably carried out in the presence of a radical generating agent.

Examples of the above-described radical generating agent include, for example, an organic peroxide, an inorganic peroxide, and an organic azo compound, and an organic peroxide is preferably used. Although not limited to the following, for example, examples of the organic peroxide include benzoyl peroxide, examples of the inorganic peroxide include potassium persulfite, and examples of the organic azo compound include azobisisobutyronitrile (AIBN).

The silsesquioxane compound of the present disclosure is used in a wide variety of applications. In particular, the fluorine-containing silsesquioxane compound that contains fluorine is not limited, but examples thereof include, for example, an additive.

The present disclosure provides a composition comprising the silsesquioxane compound represented by the above-described formula (I).

In one embodiment, the composition of the present disclosure may comprise an organic solvent. The organic solvent is not limited, but is preferably a fluorine-containing solvent.

Examples of the fluorine-containing solvent are not limited, but include ASAHIKLIN® AK-225 (manufactured by Asahi Glass Co., Ltd.), $C_2F_5CF(OCH_3)C_3F_7$, and $ClCF_2$—$CFCl$—$CF_2CF_3$.

In one embodiment, the composition of the present disclosure may further contain other components. Examples of other components are not limited, but include a dispersion stabilizer, an emulsifier, a curing agent, a photoacid generator, and a photo-radical generator.

In one embodiment, the silsesquioxane compound or the composition of the present disclosure is used as an additive.

In a preferable embodiment, the silsesquioxane compound or the composition of the present disclosure is used as an additive for a rubber material such as a fluoroelasterner, a perfluoro rubber, and a silicone-based rubber. That is, the present disclosure provides a rubber composition containing the silsesquioxane compound of the present disclosure and a rubber material, for example, fluoroelastomer, perfluoro rubber, or silicone-based rubber.

The amount of the silsesquioxane compound of the present disclosure added may appropriately vary depending on the applications to be used, the purpose, or the like. For example, the above-described amount added may be 0.1% by mass or more, preferably 1% by mass or more, more preferably 5% by mass or more, and further preferably 10% by mass or more, for example, 15% by mass or more or 20% by mass or more relative to the rubber material. In addition, the above-described amount added may be 50% by mass or less, and preferably 30% by mass or less relative to the rubber material. In one embodiment, the amount of the silsesquioxane compound of the present disclosure added may be 0.1 to 50% by mass, preferably 1 to 30% by mass, and particularly preferably 5 to 30% by mass, for example, 5.0 to 10% by mass, 5.0 to 15.0% by mass, 5.0 to 20.0% by mass, or 5.0 to 30.0% by mass.

When the silsesquioxane compound of the present disclosure is added to a rubber material, the performance of the rubber material, for example, heat resistance, resistance to oxygen plasma, or the like can be improved. In particular, by increasing the amount of the silsesquioxane compound of the present disclosure added, the above-described performance of the rubber material can be improved more. In addition, by decreasing the amount of the silsesquioxane compound of the present disclosure added, the original functions of the rubber material can be retained.

In one embodiment, the composition of the present disclosure is used as an additive for a rubber material, the composition of the present disclosure may not contain a solvent, or may contain an organic solvent, preferably a fluorine-containing solvent. The composition of the present disclosure is preferably solvent-free. When the composition of the present disclosure contains a solvent, the amount of the organic solvent to be contained in the composition of the present disclosure may be 1 to 100 parts by mass, and preferably 1.5 to 10 parts by mass relative to 1 mass of the rubber material.

The above-described fluoroelasterner may be either a non-perfluoro fluoroelastomer or a perfluoro fluoroelastomer.

The above-described fluoroelastomer preferably contains a structural unit derived from at least one monomer selected from the group consisting of, for example, tetrafluoroethylene (TFE), vinylidene fluoride (VdF), and a perfluoro ethylenically unsaturated compound (for example, hexafluoropropylene (HFP) and perfluoro(alkylvinyl ether) (PAVE)) represented by the following formula (a):

$$CF_2=CF-Rf^a \quad (a)$$

wherein $Rf^a$ is $-CF_3$ or $ORf^b$ ($Rf^b$ represents a perfluoroalkyl group having 1 to 5 carbon atoms).

Examples of the non-perfluoro fluoroelasterner include a vinylidene fluoride (VdF)-based fluoroelastomer, a tetrafluoroethylene (TFE)/propylene (Pr)-based fluoroelastomer, a tetrafluoroethylene (TFE)/propylene (Pr)/vinylidene fluoride (VdF)-based fluoroelastomer, an ethylene (Ft)/hexafluoropropylene (HFP)-based fluoroelastomer, an ethylene (Ft)/hexafluoropropylene (HFP)/vinylidene fluoride (VdF)-based fluoroelastomer, an ethylene (Et)/hexafluoropropylene (HFP)/tetrafluoroethylene (TFE)-based fluoroelastomer, a flucresilicone-based fluoroelastomer, and a fluorophosphazene-based fluoroelastomer, and these may be used alone or in combination. In addition, these fluoroelastomers may be a copolymer with a comonomer.

Examples of the above-described comonomer are not limited as long as it is copolymerizable with other monomers and include, for example, a fluorine-containing monomer (c) such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, an iodine-containing fluorinated vinyl ether, and a fluorine-containing monomer represented by the following general formula (b):

$$CH_2=CFRf^b \quad (b)$$

wherein $Rf^b$ represents a linear or branched fluoroalkyl group having 1 to 12 carbon atoms;
a perfluorovinyl ether represented by $$CF_2=CFOCF_2ORf^c \quad (c)$$

wherein $Rf^c$ represents a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms;
a fluorine-free monomer such as ethylene (Et), propylene (Pr), and an alkylvinyl ether; and a reactive emulsifier, and these may be used alone or two or more in combination.

Examples of such a copolymer are not limited, but include, for example, at least one copolymer selected from the group consisting of a VdF/HFP copolymer, a VdF/TFE/HFP copolymer, a VdF/CTFE copolymer, a VdF/CTFE/TFE HFP copolymer, a VdF/PAVE copolymer, a VdF/TFE/PAVE copolymer, a VdF/HFP/PAVE copolymer, a VdF/HFP/TFE/PAVE copolymer, a VdF/TFE/propylene (Pr) copolymer, a VdF/ethylene (Et)/HFP copolymer, and a copolymer of the fluorine-containing monomer (b) represented by the VdF/ formula (b).

In one embodiment, the fluoroelasterner may be a fluoroelastomer used for a sealing material such as O-ring, for example, a vinylidene fluoride-based (FKM) fluoroelastomer, a tetrafluoroethylene-propylene-based (FEPM) fluoroelastomer, and a tetrafluoroethylene-perfluorovinyl ether-based (FFKM) fluoroelastomer.

The above-described fluorine-containing elastomer preferably has a glass transition temperature of −70° C. or more, more preferably −60° C. or more, and further preferably −50° C. or more, from the viewpoint that compression set at high temperature is excellent In addition, the glass transition temperature is preferably 5° C. or less, more preferably 0° C. or less, and further preferably −3° C. or less, from the viewpoint that cold resistance is satisfactory.

The above-described glass transition temperature can be determined by raising the temperature of 10 mg of a sample at a rate of 10° C./min using a differential scanning calorimeter (manufactured by Mettier-Toledo International Inc., DSC822e) to obtain a DSC curve, as a temperature indicating the midpoint of the two intersection points of the extended line of the baseline before and after the second-order transition of the DSC curve and the tangent line at the inflection point of the DSC curve.

The above-described fluorine-containing elastomer preferably has a Mooney viscosity ML(1+20) at 170° C. of 30 or more, more preferably 40 or more, and further preferably 50 or more, from the viewpoint that heat resistance is satisfactory. In addition, the Mooney viscosity ML(1+20) at 170° C. is preferably 150 or less, more preferably 120 or less, and further preferably 110 or less, from the viewpoint that processability is satisfactory.

The above-described fluorine-containing elastomer preferably has a Mooney viscosity ML(1+20) at 140° C. of 30 or more, more preferably 40 or more, and further preferably 50 or more, from the viewpoint that heat resistance is satisfactory. In addition, the Mooney viscosity ML(1+20) at 140° C. is preferably 180 or less, more preferably 150 or less, and further preferably 110 or less, from the viewpoint that processability is satisfactory.

The above-described fluorine-containing elastomer preferably has a Mooney viscosity ML(1+10) at 100° C. of 10 or more, more preferably 20 or more, and further preferably or more, from the viewpoint that heat resistance is satisfactory. In addition, the Mooney viscosity ML(1+10) at 100° C. is preferably 120 or less, more preferably 100 or less, and further preferably 80 or less, from the viewpoint that processability is satisfactory.

The above-described Mooney viscosity can be measured using the Mooney viscometer MV2000E manufactured by ALPHA TECHNOLOGIES at 170° C., 140° C., or 100° C. in accordance with JIS K6300.

The above-described composition may further contain another cross-linking agent. Examples of the above-described another cross-linking agent include a cross-linking agent used for peroxide crosslinking, polyol crosslinking, polyamine crosslinking, triazine crosslinking, oxazole crosslinking, imidazole crosslinking, and thiazole crosslinking.

The cross-linking aid used for the above-described peroxide crosslinking is only required to be an organic peroxide that may easily generate a peroxy radical in the presence of heat or a redox system and specific examples thereof include, for example, 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, 2,5-dimethyl-2,5-di(benzoylperoxy)hexane, t-butyl peroxymaleic acid, and t-butylperoxyisopropyl carbonate. In general, the type and the amount used of the organic peroxide are selected in consideration of the amount of the active —O—O—, the decomposition temperature, and the like.

In addition, the cross-linking agent usable in this case is only required to be a compound having reaction activity with a peroxy radical and a polymer radical, and examples thereof include, for example, a polyfunctional compound containing a functional group such as $CH_2$=CH—, $CH_2$=CHCH$_2$—, and $CF_2$=CF—. Specific examples thereof include, for example, triallyl cyanurate, triallyl isocyanurate (TAIC), triacrylformal, triallyl trimellitate, N,N'-n-phenylene bismaleimide, dipropargyl terephthalate, diallyl phthalate, tetraallyl terephthalateamide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-diallylacrylamide, and 1,6-divinyldodecafluorohexane.

Examples of the cross-linking agent used for the above-described polyol crosslinking include a polyhydric alcohol compound such as bisphenol A and bisphenol AF.

Examples of the cross-linking agent used for the above-described polyamine crosslinking include a polyvalent amine compound such as hexamethylenediamine carbamate, N,N'-dicinnamylidene-1,6-hexanediamine, and 4,4'-bis(aminocyclohexyl)methane carbamate.

Examples of the cross-linking agent used for the above-described triazine crosslinking include an organic tin compound such as tetraphenyltin and triphenyltin.

Examples of the cross-linking agent used for the above-described oxazole cross-linking system, imidazole cross-linking system, and thiazole cross-linking system include, for example, a bisdiaminophenyl-based cross-linking agent, a bisaminophenol-based cross-linking agent, and a bisaminothiophenol-based cross-linking agent each represented by the general formula (20):

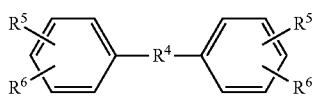

(20)

(wherein $R^4$ is —$SO_2$—, —O—, —CO—, an alkylene group having 1 to 6 carbon atoms, a perfluoroalkylene group having 1 to 10 carbon atoms, or a single bond, or a group represented by:

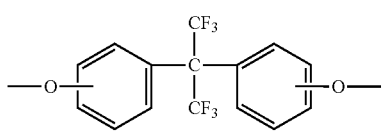

wherein either one of $R^5$ and $R^6$ is —$NH_2$ and the other is —$NHR^7$, —$NH_2$, —OH, or —SH; and $R^7$ is a hydrogen atom, a fluorine atom, or a monovalent organic group; and preferably, $R^5$ is —$NH_2$ and $R^6$ is —$NHR^7$; wherein specific preferable examples of the alkylene group having 1 to 6 carbon atoms include a methylene group, an ethylene group, a propylene group, a butylene group, a pentylene group, and a hexylene group; and examples of the perfluoroalkylene group having 1 to 10 carbon atoms include:

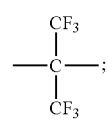

and wherein these compounds are known as examples of the bisdiaminophenyl compound in Japanese Patent Publication No. H02-59177, Japanese Patent Laid-Open No. H08-120146, and the like); a bisamidrazone-based cross-linking agent represented by the general formula (21):

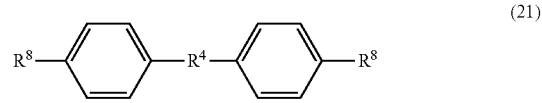

(21)

(wherein $R^4$ is the same as that described above; and $R^8$ is a group represented by:

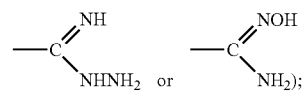

and
a bisamidoxime-based cross-linking agent represented by the general formula (22):

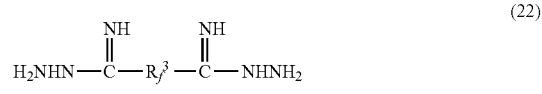

(22)

(wherein $Rf^3$ is a perfluoroalkylene group having 1 to 10 carbon atoms)
or the general formula (23):

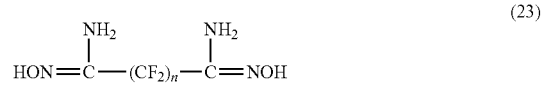

(23)

(wherein n is an integer of 1 to 10). The bisaminophenol-based cross-linking agent, the bisaminothiophenol-based cross-linking agent, or the bisdiaminophenyl-based cross-linking agent have conventionally been used in crosslinking systems in which the crosslinking point is a cyano group, but they also react with a carboxyl group and an alkoxycarbonyl group and form an oxazole ring, a thiazole ring, and an imidazole ring to give a crosslinked product.

Examples of the particularly preferable another cross-linking agent include a compound having a plurality of 3-amino-4-hydroxyphenyl groups or 3-amino-4-mercaptophenyl groups, or a compound represented by the general formula (24):

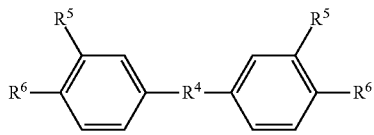

wherein $R^4$, $R^5$, and $R^6$ are the same as that described above; and in particular, for example, 2,2-bis(3-amino-4-hydroxyphenyl)hexafluoropropane (general name: bis(aminophenol) AF), 2,2-bis(3-amino-4-mercaptophenyl)hexafluoropropane, tetraaminobenzene, bis-3,4-diaminophenylmethane, bis-3,4-diaminophenyl ether, 2,2-bis(3,4-diaminophenyl) hexafluoropropane, 2,2-bis[3-amino-4-(N-phenylamino) phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl] hexafluoropropane, and 2,2-bis[3-amino-4-(N-benzylamino)phenyl]hexafluoropropane.

Among these, another cross-linking agent is preferably 2,2-bis[3-amino-4-(N-phenylamino)phenyl]hexafluoropropane from the viewpoint of heat resistance, steam resistance, resistance to amines, and satisfactory crosslinkability.

The above-described another cross-linking agent is preferably 0.05 to 10 parts by mass and more preferably 0.5 to 5 parts by mass relative to 100 parts by mass of the fluorine-containing polymer. When the amount of the cross-linking agent is less than 0.05 parts by mass, there is a tendency that the fluorine-containing polymer is not sufficiently crosslinked, and when the amount exceeds 10 parts by mass, physical properties of a crosslinked product tend to be deteriorated.

The silsesquioxane compound of the present disclosure can impart a variety of performance to a rubber material by mixing with, in particular, the rubber material or the raw material of the rubber material. For example, even in a case where the rubber material to which the silsesquioxane compound of the present disclosure is added is used in applications subjected to oxygen plasma, deterioration is less likely to occur and drop-out of a compound and the like which may cause a variety of problem can be suppressed. In addition, if drop out has occurred, the silsesquioxane compound of the present disclosure has a molecular size and therefore can reduce the influence on its surroundings. In addition, the silsesquioxane of the present disclosure can be satisfactory dispersed in a non-perfluoro rubber or a perfluoro rubber by appropriately changing the structure of the branched chain. For example, it can be satisfactory mixed with a vinylidene fluoride-based rubber by changing the branched chain to a methacrylic polymer chain. Also, it can be satisfactory mixed with a perfluoro rubber by changing the branched chain to a polymer chain derived from a fluorine-containing monomer.

Although the present invention is described in detail, the present invention is not limited to the above-described compounds and applications.

EXAMPLES

Hereinafter, the structure of silsesquioxane is abbreviated as follows.

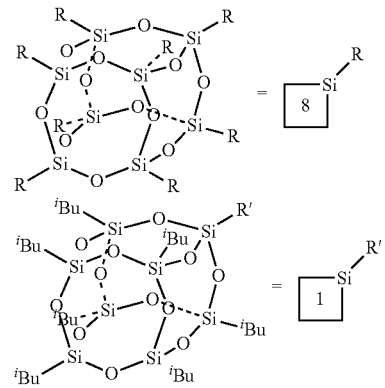

Synthetic Example 1: Perfluoroalkylation of 8-Functional Vinylated Cage Oligomeric Silsesquioxane (Hereinafter Also Referred to as "POSS")

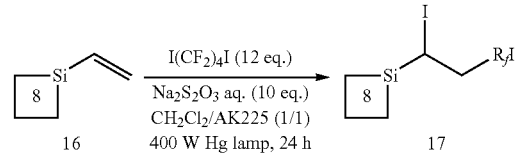

To a mixed solution of 8-functional vinylated POSS (16) (0.3 mmol) in dichloromethane/AK225 (1/1), 1,4-diiodooctafluorobutane (16 eq.) and an aqueous sodium thiosulfate solution (10 eq.) were added, and the mixture was subjected to light application for 24 hours by a 400 W high-pressure mercury lamp to obtain perfluoroalkylated POSS (17) ($R_f$=—$(CF_2)_4$—) (913.7 mg).
$^1$H NMR (400 MHz, CDCl$_3$); 3.4 (8H, br, CHI), 2.9 (CH$_2$)
$^{19}$F NMR (376 MHz, CDCl$_3$); −58.6 (16F, s, ICF$_2$), −112.6 (16F, s, CF$_2$), −114 (16F, br, CF$_2$), −122 (2F, S, CF$_2$)

Example 1: Polymerization of Methyl Methacrylate (Hereinafter Also Referred to as "MMA") with Perfluoroalkylated POSS

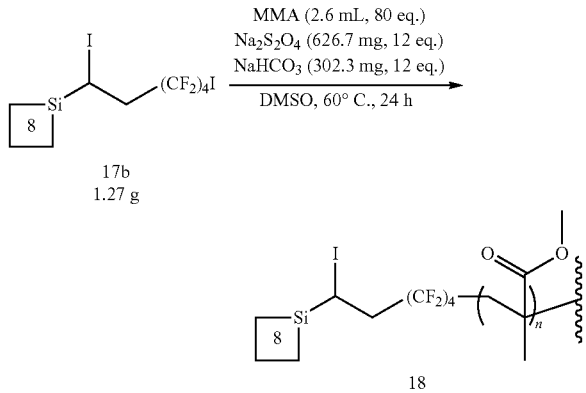

Mn = 1.5 × 10$^{5\ a)}$
Mw/Mn = 10.4 $^{a)}$ a) GPC Measurement in THF (Linear Polystyrene as Calibration Standard)

To a solution of the perfluoroalkylated POSS (17) in dimethyl sulfoxide (1 mL), MMA (80 eq.), sodium dithionite (12 eq.; 1.5 eq. relative to iodine moiety), and sodium bicarbonate (12 eq.) were added and the mixture was stirred at 60° C. for 24 hours. After the reaction, the obtained product was re-precipitated with methanol to obtain the compound 18.

$^1$H NMR (400 MHz, CDCl$_3$); 3.6 (C(O)OCH$_3$), 2.1-1.6 (CH$_2$C(CH$_3$)(C(O)OCH$_3$), 1.1 (C(CH$_3$)), 0.9 (C(CH$_3$))

$^{19}$F NMR (376 MHz, CDCl$_3$); −52 (16F, br, ICF$_2$), −106 (16F, br, CF$_2$), −107 (16F, br, CF$_2$), −115 (2F, s, CF$_2$)

Synthetic Example 2

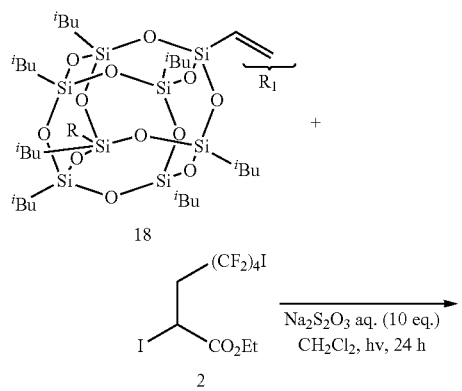

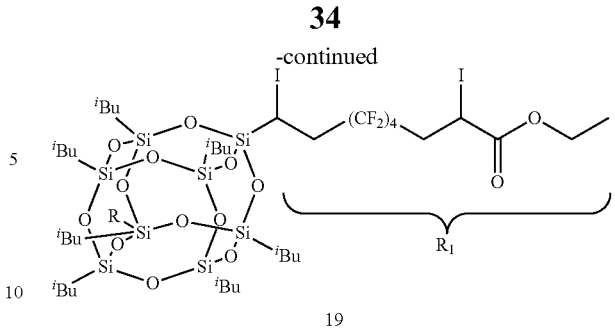

In a pyrex tube, the compound 18 (168 mg) was dissolved in CH$_2$Cl$_2$ (5.0 ml) and the compound 2 (553 mg) and an aqueous sodium thiosulfate solution (317 mg, 1 ml aqueous solution) were added thereto, and then the ultraviolet light was applied thereto for 24 hours using a 400 W high-pressure mercury lamp while keeping the temperature of the reaction system at a certain level. The analysis of the obtained reaction mixture by $^1$H and $^{19}$F NMR demonstrates that the compound 19 was obtained in 52% yield.

$^1$H NMR (400 MHz, CDCl$_3$); 4.60 (1H, m, CH$_2$CHICO$_2$CH$_2$)), 4.23 (2H, q, CO$_2$CH$_2$CH$_3$), 3.30 (1H, m, CF$_2$CH$_2$CHI), 3.12 (1H, dd, SiCHICH$_2$), 2.88 (1H, m, CF$_2$CH$_2$CHI), 2.80-2.45 (2H, m, SiCHICH$_2$CF$_2$), 1.86 (7H, tq, CH$_2$CH(CH$_3$)$_2$), 1.28 (3H, t, CO$_2$CH$_2$CH$_3$), 0.95 (14H, d, CH$_2$CH(CH$_3$)$_2$), 0.64 (42H, m, SiCH$_2$CH(CH$_3$)$_2$)

$^{19}$F NMR (376 MHz, CDCl$_3$); −115.0 (2F, dd, CH$_2$CF$_2$), −115.6 (2F, dd, CF$_2$CH$_2$) −124.1 (4F, s, CF$_2$CF$_2$CF$_2$CF$_2$)

Example 2

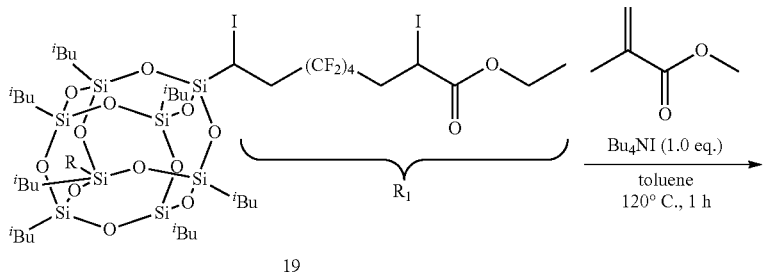

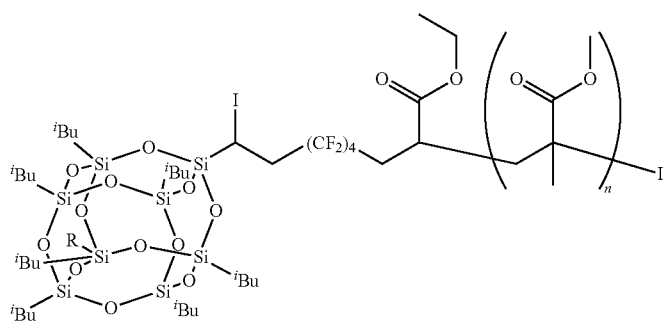

In a reaction vessel, the compound 19 (150 mg) was dissolved in toluene (0.37 mL), methyl methacrylate (1.1 mL) and tetrabutylammonium iodide (36.7 mg) were added thereto, and after the inside of the reaction vessel was sufficiently replaced with an inert gas, the reaction vessel was heated at 120° C. for 1 hour. After the termination of the reaction, the mixture was purified by re-precipitation to obtain the compound 20 (yield 36%, $M_n=1.2\times10^4$, $M_w/M_n=1.15$).

$^1$H NMR (400 MHz, CDCl$_3$); 4.14 (2H, q, CO$_2$C$\underline{H}_2$CH$_3$), 3.60 (3nH, s, CO$_2$C$\underline{H}_3$), 3.12 (1H, dd, SiC$\underline{H}$ICH$_2$), 2.65-2.45 (2H, m, SiCHIC$\underline{H}_2$CF$_2$), 2.1-1.7 (br, C$\underline{H}_2$C(CH$_3$)(CO$_2$CH$_3$)), 1.50-1.35 (br, C$\underline{H}_2$C(CH$_3$)(CO$_2$CH$_3$)), 1.30-1.18 (br, C$\underline{H}_2$C(CH$_3$)(CO$_2$CH$_3$)), 1.02 (s, C$\underline{H}_2$C(CH$_3$)(CO$_2$CH$_3$)), 0.95 (14H, d, SiCH$_2$CH(C$\underline{H}_3$)$_2$), 0.85 (s, C$\underline{H}_2$C(CH$_3$)(CO$_2$CH$_3$)), 0.64 (42H, m, SiC$\underline{H}_2$C$\underline{H}$(CH$_3$)$_2$)

$^{19}$F NMR (376 MHz, CDCl$_3$); −114.28 (2F, C$\underline{F}_2$CH$_2$CF$_2$), −115.6 (2F, C$\underline{F}_2$CH$_2$), −124.2 (4F, s, CF$_2$C$\underline{F}_2$C$\underline{F}_2$CF$_2$)

INDUSTRIAL APPLICABILITY

The silsesquioxane compound of the present disclosure can be used for a variety of applications such as a filler.

The invention claimed is:

1. A silsesquioxane compound represented by the following formula (I):

(R$^a$SiO$_{1.5}$)$_n$ wherein

R$^a$ is, each independently at each occurrence, R$^b$ or R$^c$; provided that at least one R$^a$ is R$^b$;

R$^b$ is —R$^1$—CF$_2$—R$^2$—R$^3$;

R$^1$ is —(CF$_2$)$_{s1}$— or —(CF$_2$)$_{t1}$O(CF$_2$)$_{t2}$—;

s1 is an integer of 2 to 10;

t1 and t2 are each independently an integer of 2 to 6;

R$^2$ is a divalent polymer chain;

R$^3$ is a halogen atom or a hydrogen atom;

R$^c$ is a hydrogen atom, an alkyl group, a phenyl group, or —(OSiR$^{15}_2$)$_j$—R$^{15}$;

R$^{15}$ is, each independently at each occurrence, a hydrogen atom or an alkyl group having 1 to 6 carbon atoms;

j is, each independently at each occurrence, an integer of 1 to 3; and n is an integer of 4 or more.

2. The silsesquioxane compound according to claim 1, wherein R$^3$ is bromine or iodine.

3. The silsesquioxane compound according to claim 1, wherein the divalent polymer chain in R$^2$ is a divalent fluorine-containing polymer chain.

4. The silsesquioxane compound according to claim 1, wherein the divalent polymer chain in R$^2$ is composed of a monomer unit derived from monofluoroethylene, 1,1-difluoroethylene, 1,3-difluoroethylene, trifluoroethylene, tetrafluoroethylene, 1,1,1,2-tetrafluoro-2-propylene, hexafluoropropylene, perfluoro(alkylvinyl ether), chlorotrifluoroethylene, vinylidene fluoride, (meth)acrylic acid, (meth)acrylic acid ester, styrene, vinyl acetate, vinyl chloride, vinylidene chloride, or 1,3-butadiene.

* * * * *